(12) United States Patent
Seabaugh et al.

(10) Patent No.: US 12,403,671 B2
(45) Date of Patent: *Sep. 2, 2025

(54) ROLL INCLUDING AIR AND WATER BARRIER ARTICLE AND METHOD OF USING THE SAME

(71) Applicant: 3M INNOVATIVE PROPERTIES COMPANY, St. Paul, MN (US)

(72) Inventors: Taylor M. Seabaugh, Stanford, CA (US); Martin J. O. Widenbrant, Stillwater, MN (US); Daniel R. Fronek, Woodbury, MN (US); Kanta Kumar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 2031 days.

This patent is subject to a terminal disclaimer.

(21) Appl. No.: 16/065,248

(22) PCT Filed: Dec. 21, 2016

(86) PCT No.: PCT/US2016/067993
§ 371 (c)(1),
(2) Date: Jun. 22, 2018

(87) PCT Pub. No.: WO2017/112756
PCT Pub. Date: Jun. 29, 2017

(65) Prior Publication Data
US 2021/0207005 A1  Jul. 8, 2021

Related U.S. Application Data

(60) Provisional application No. 62/357,137, filed on Jun. 30, 2016.

(30) Foreign Application Priority Data

Dec. 22, 2015 (WO) ................. PCT/US2015/067261

(51) Int. Cl.
*B32B 7/12* (2006.01)
*C09J 7/29* (2018.01)
(Continued)

(52) U.S. Cl.
CPC .................. *B32B 7/12* (2013.01); *C09J 7/29* (2018.01); *C09J 7/40* (2018.01); *E04B 1/625* (2013.01);
(Continued)

(58) Field of Classification Search
None
See application file for complete search history.

(56) References Cited

U.S. PATENT DOCUMENTS 3,039,893 A  6/1962 Banigan, Jr.
3,169,899 A  2/1965 Steuber
(Continued)

FOREIGN PATENT DOCUMENTS

CN  1869375  11/2006
CN  201047117  4/2008
(Continued)

OTHER PUBLICATIONS

Mukhopadhyay, "A Review on Designing the Waterproof Breathable Fabrics Part I: Fundamental Principles and Designing Aspects of Breathable Fabrics", 2008, Journal of Industrial Textiles, vol. 37, No. 3, pp. 225-262.
(Continued)

*Primary Examiner* — Alicia Chevalier
*Assistant Examiner* — Thomas A Mangohig
(74) *Attorney, Agent, or Firm* — Kathleen B. Gross

(57) ABSTRACT

The roll includes an air and water barrier article, a pressure sensitive adhesive disposed on the first major surface of the barrier article, first and second coating compositions disposed on the opposing second major surface of the barrier article, and a liner having a first major surface in contact
(Continued)

with the first coating composition and the second coating composition. The first coating composition has a first peel adhesion to the first major surface of the liner that is lower than a second peel adhesion of the second coating composition to the first major surface of the liner. The pressure sensitive adhesive contacts a second major surface of the liner when wound in the roll, and a peel adhesion between the second major surface of the liner and the pressure sensitive adhesive is less than or equal to the second peel adhesion. There are also provided methods of applying barrier articles, films made using these barrier articles, and building envelopes made using such films.

20 Claims, 2 Drawing Sheets

(51) Int. Cl.
*C09J 7/40* (2018.01)
*E04B 1/62* (2006.01)
*E04B 1/66* (2006.01)
*C09J 7/38* (2018.01)

(52) U.S. Cl.
CPC ............... *E04B 1/665* (2013.01); *C09J 7/38* (2018.01); *C09J 2301/302* (2020.08); *C09J 2301/312* (2020.08); *C09J 2400/263* (2013.01); *Y10T 428/14* (2015.01)

(56) References Cited

U.S. PATENT DOCUMENTS

| | | | |
|---|---|---|---|
| 3,426,754 A | 2/1969 | Bierenbaum | |
| 3,532,589 A | 10/1970 | David | |
| 3,592,795 A | 7/1971 | Ashby | |
| 3,627,722 A | 12/1971 | Seiter | |
| 3,632,557 A | 1/1972 | Brode | |
| 3,711,445 A | 1/1973 | Chu | |
| 3,831,342 A | 8/1974 | Rejsa | |
| 3,900,102 A | 8/1975 | Hurst | |
| 3,937,640 A | 2/1976 | Tajima | |
| 4,067,844 A | 1/1978 | Barron | |
| 4,153,594 A | 5/1979 | Wilson, Jr. | |
| 4,201,808 A | 5/1980 | Cully | |
| 4,345,053 A | 8/1982 | Rizk | |
| 4,366,307 A | 12/1982 | Singh | |
| 4,374,237 A | 2/1983 | Berger | |
| 4,543,403 A | 9/1985 | Isayama | |
| 4,576,999 A | 3/1986 | Eckberg | |
| 4,593,068 A | 6/1986 | Hirose | |
| 4,618,653 A | 10/1986 | Kawakubo | |
| 4,618,656 A | 10/1986 | Kawakubo | |
| 4,645,816 A | 2/1987 | Pohl | |
| 4,654,417 A | 3/1987 | Inoue | |
| 4,687,818 A | 8/1987 | Kawakubo | |
| 4,751,122 A | 6/1988 | May | |
| 4,774,356 A | 9/1988 | Inoue | |
| 4,822,451 A | 4/1989 | Ouderkirk | |
| 4,900,772 A | 2/1990 | Imanaka | |
| 4,904,732 A | 2/1990 | Iwahara | |
| 4,904,745 A | 2/1990 | Inoue | |
| 4,923,650 A | 5/1990 | Antoon | |
| 4,960,844 A | 10/1990 | Singh | |
| 5,068,304 A | 11/1991 | Higuchi | |
| 5,120,594 A | 6/1992 | Mrozinski | |
| 5,223,583 A | 6/1993 | Higuchi | |
| 5,227,434 A * | 7/1993 | Katz | C08G 18/671 525/419 |
| 5,316,848 A | 5/1994 | Bartlett | |
| 5,317,035 A | 5/1994 | Jacoby | |
| 5,348,791 A | 9/1994 | Thompson | |
| 5,364,955 A | 11/1994 | Zwiener | |
| 5,374,477 A | 12/1994 | Lawless | |
| 5,593,771 A | 1/1997 | Lawless | |
| 5,756,751 A | 5/1998 | Schmalstieg | |
| 5,811,566 A | 9/1998 | Watabe | |
| 5,882,573 A | 3/1999 | Kwok | |
| 5,895,301 A | 4/1999 | Porter | |
| 5,972,147 A | 10/1999 | Janis | |
| 5,986,014 A | 11/1999 | Kusakabe | |
| 5,990,257 A | 11/1999 | Johnston | |
| 6,001,946 A | 12/1999 | Waldman | |
| 6,046,270 A | 4/2000 | Roesler | |
| 6,176,961 B1 | 1/2001 | Mossbeck et al. | |
| 6,197,912 B1 | 3/2001 | Huang | |
| 6,235,365 B1 | 5/2001 | Schaughency | |
| 6,361,634 B1 | 3/2002 | White | |
| 6,495,229 B1 | 12/2002 | Carte | |
| 6,534,129 B1 | 3/2003 | Miller et al. | |
| 6,602,809 B1 | 8/2003 | Cabrey | |
| 6,645,887 B2 | 11/2003 | Kocinec et al. | |
| 6,706,225 B2 | 3/2004 | Cabrey | |
| 6,901,712 B2 | 6/2005 | Lionel | |
| 7,060,750 B2 | 6/2006 | Jansen | |
| 7,094,859 B2 | 8/2006 | Schindler | |
| 7,153,923 B2 | 12/2006 | Schindler | |
| 7,351,296 B2 | 4/2008 | Waggoner | |
| 7,682,675 B2 | 3/2010 | Boge | |
| 7,718,250 B2 | 5/2010 | Sieber | |
| 7,829,488 B2 | 11/2010 | Bennett | |
| 7,833,916 B2 | 11/2010 | Leeser | |
| 7,846,504 B2 | 12/2010 | Maier | |
| 7,867,591 B2 | 1/2011 | Sieber | |
| 8,001,736 B2 | 8/2011 | Goldberg | |
| 8,061,098 B2 | 11/2011 | Whelan | |
| 8,215,083 B2 | 7/2012 | Toas | |
| 8,277,915 B2 | 10/2012 | Couturier | |
| 8,334,227 B2 | 12/2012 | Tee et al. | |
| 8,399,088 B2 | 3/2013 | Deng | |
| 8,535,786 B2 | 9/2013 | Schroer | |
| 8,551,594 B2 | 10/2013 | Deiss | |
| 8,609,213 B2 | 12/2013 | Wiercinski et al. | |
| 8,613,181 B2 | 12/2013 | Jay | |
| 8,826,611 B2 | 9/2014 | Veilleux | |
| 8,883,284 B2 | 11/2014 | Todt | |
| 8,893,440 B2 | 11/2014 | Wetmore | |
| 8,931,228 B2 | 1/2015 | Wiercinski et al. | |
| 8,931,229 B2 | 1/2015 | Wiercinski et al. | |
| 8,986,786 B2 | 3/2015 | Maier | |
| 9,133,612 B2 | 9/2015 | Wiercinski et al. | |
| 9,192,960 B2 | 11/2015 | Tanley | |
| 9,238,203 B2 | 1/2016 | Scheibner | |
| 9,266,144 B2 | 2/2016 | Maier | |
| 9,394,464 B2 | 7/2016 | Wiercinski et al. | |
| 9,476,196 B2 | 10/2016 | Wiercinski et al. | |
| 9,562,174 B2 | 2/2017 | Russell | |
| 9,731,314 B2 | 8/2017 | Maier | |
| 2002/0108564 A1 | 8/2002 | Gruenewald | |
| 2003/0017292 A1 | 1/2003 | Sieber | |
| 2003/0051807 A1 | 3/2003 | Yamaguchi | |
| 2003/0056722 A1 | 3/2003 | Kitano et al. | |
| 2003/0064190 A1 | 4/2003 | Carte et al. | |
| 2003/0070391 A1 | 4/2003 | Tachauer | |
| 2003/0165651 A1 | 9/2003 | Sieber | |
| 2003/0180468 A1 | 9/2003 | Cray | |
| 2004/0081794 A1 | 4/2004 | Titone | |
| 2004/0103608 A1 | 6/2004 | Lionel | |
| 2004/0137185 A1 | 7/2004 | Sieber | |
| 2004/0137813 A1 | 7/2004 | Faucher | |
| 2004/0180195 A1 | 9/2004 | Macuga | |
| 2004/0224117 A1 | 11/2004 | Amano | |
| 2005/0028938 A1 | 2/2005 | Hill | |
| 2005/0058798 A1 | 3/2005 | Sieber | |
| 2005/0069698 A1 | 3/2005 | Eubanks | |
| 2005/0137549 A1 | 6/2005 | Lindsay et al. | |
| 2006/0040091 A1 | 2/2006 | Bletsos | |
| 2006/0051558 A1 | 3/2006 | Sieber | |
| 2007/0042196 A1 | 2/2007 | Smith | |
| 2007/0060732 A1 | 3/2007 | Yang | |
| 2007/0110943 A1 | 5/2007 | Sieber | |
| 2007/0281562 A1 | 12/2007 | Kohlman | |
| 2007/0282080 A1 | 12/2007 | Kawakami | |

(56) References Cited

U.S. PATENT DOCUMENTS

| | | |
|---|---|---|
| 2008/0022620 A1 | 1/2008 | Crowley |
| 2008/0058492 A1 | 3/2008 | Griswold |
| 2008/0114098 A1 | 5/2008 | Griswold |
| 2008/0135159 A1 | 6/2008 | Bries |
| 2008/0153924 A1 | 6/2008 | Caron |
| 2008/0258341 A1 | 10/2008 | Parkes |
| 2008/0289279 A1 | 11/2008 | Hannan |
| 2009/0317583 A1 | 12/2009 | Naumann |
| 2010/0012882 A1 | 1/2010 | Sherman |
| 2010/0154338 A1 | 6/2010 | Riccelli |
| 2010/0307658 A1 | 12/2010 | Galush et al. |
| 2011/0151169 A1 | 6/2011 | Maier |
| 2011/0185666 A1 | 8/2011 | Russel |
| 2011/0244742 A1 | 10/2011 | Huang |
| 2012/0088052 A1 | 4/2012 | Cantu |
| 2012/0174508 A1 | 7/2012 | Brooks |
| 2012/0207998 A1 | 8/2012 | Ando |
| 2013/0059105 A1 | 3/2013 | Wright |
| 2013/0084419 A1 | 4/2013 | Taylor |
| 2013/0196163 A1 | 8/2013 | Swanson |
| 2013/0274700 A1 | 10/2013 | Harris |
| 2014/0037882 A1 | 2/2014 | Georgeau |
| 2014/0093679 A1 | 4/2014 | Okamoto |
| 2014/0186566 A1 | 7/2014 | Wood |
| 2015/0037548 A1 | 2/2015 | Jablonka |
| 2015/0225614 A1 | 8/2015 | Kim |
| 2015/0267076 A1 | 9/2015 | Bodkhe |
| 2015/0298427 A1 | 10/2015 | Kronenberg |
| 2015/0368508 A1 | 12/2015 | Bodkhe |
| 2017/0072430 A1 | 3/2017 | Maier |
| 2017/0173916 A1 | 6/2017 | Widenbrant |
| 2017/0218223 A1 | 8/2017 | Bodkhe |
| 2018/0001595 A1* | 1/2018 | Seabaugh ............... B32B 27/10 |
| 2018/0237662 A1 | 8/2018 | Widenbrant |
| 2018/0245332 A1 | 8/2018 | Widenbrant |

FOREIGN PATENT DOCUMENTS

| | | |
|---|---|---|
| CN | 202866172 | 4/2013 |
| DE | 19817829 | 1/1999 |
| DE | 10031213 | 1/2002 |
| DE | 10255600 | 6/2004 |
| EP | 0 676 403 | 9/1999 |
| EP | 1289754 | 11/2003 |
| EP | 1 459 884 | 11/2006 |
| EP | 2 101 027 | 12/2014 |
| EP | 2 868 468 | 5/2015 |
| FR | 2917758 | 12/2008 |
| GB | 2473618 | 3/2011 |
| JP | S50-156599 | 12/1975 |
| JP | S54-006096 | 1/1979 |
| JP | S55-013767 | 1/1980 |
| JP | S55-013768 | 1/1980 |
| JP | S57-164123 | 10/1982 |
| JP | S59-122541 | 7/1984 |
| JP | S64-022904 | 1/1989 |
| JP | H04-055444 | 9/1992 |
| JP | H06-172631 | 6/1994 |
| JP | H06-211922 | 8/1994 |
| JP | H11-060724 | 3/1999 |
| JP | H11-071823 | 3/1999 |
| JP | H11-100427 | 4/1999 |
| JP | H11-116763 | 4/1999 |
| JP | 2000-169544 | 6/2000 |
| JP | 2000-169565 | 6/2000 |
| JP | 2001-072854 | 3/2001 |
| JP | 2001-294830 | 10/2001 |
| JP | 2001-323040 | 11/2001 |
| JP | 2002-155145 | 5/2002 |
| JP | 2002-212415 | 7/2002 |
| JP | 3313360 | 8/2002 |
| JP | 2002-249538 | 9/2002 |
| JP | 2004-137405 | 5/2004 |
| JP | 2004-137861 | 5/2004 |
| JP | 2008-303650 | 12/2008 |
| WO | WO 1995-033007 | 12/1995 |
| WO | WO 1998-056866 | 12/1998 |
| WO | WO 2002-001013 | 1/2002 |
| WO | WO 2008-085394 | 7/2008 |
| WO | WO 2010-104862 | 9/2010 |
| WO | WO 2011-081894 | 7/2011 |
| WO | WO 2012-092019 | 7/2012 |
| WO | WO 2013-136108 | 9/2013 |
| WO | WO 2014-047018 | 3/2014 |
| WO | WO 2015-010208 | 1/2015 |
| WO | WO 2015-126931 | 8/2015 |
| WO | WO 2016-106273 | 6/2016 |

OTHER PUBLICATIONS

Premium Self-adhering Water Resistive and Air Barrier, Delta Cosella Dorken, Spycor Building Products < https://www.spycorbuilding.com/Cosella-Dorken-DELTA-VENT-SA-p/dlvt-sa.htm > , pp. 1-3.

Wang, "Controlled Living" Radical Polymerization, Atom Transfer Radical Polymerization in the Presence of Transition-Metal Complexes, J. Am. Chem. Soc, 1995, vol. 117, pp. 5614-5615.

International Search Report for PCT International Application No. PCT/US2016/067993, mailed on Feb. 13, 2017, 5 pages.

* cited by examiner

ROLL INCLUDING AIR AND WATER BARRIER ARTICLE AND METHOD OF USING THE SAME

CROSS REFERENCE TO RELATED APPLICATIONS

This application is a national stage filing under 35 U.S.C. 371 of PCT/US2016/067993, filed Dec. 21, 2016, which claims priority to PCT Application No. PCT/US2015/067261, filed Dec. 22, 2015, and U.S. Provisional Application No. 62/357,137, filed Jun. 20, 2016, the disclosures of which are incorporated by reference in their entirety herein.

BACKGROUND

Air barrier systems control movement of air, and specifically water vapor, across a surface of a structure, such as a building enclosure. In exterior walls, uncontrolled air flow is the greatest source of moisture and condensation damage. Indoor comfort is affected by air temperature, relative humidity, direction of airflow and surrounding surface temperatures. Indoor air quality is enhanced by air barrier systems by efficiently keeping pollutants out of building interiors. Pollutants include water vapor, suspended particulates, dust, insects, and smells, for example. Air barrier systems have significant impact on electricity consumption and gas bills. Air barrier systems in nonresidential buildings are estimated to reduce air leakage by up to 83 percent, reduce heating bills more than 40% and reduce electricity consumption more than 25% according to simulations by the National Institute of Standards and Technology (NIST) compared to typical buildings without air barriers. Water vapor is a key ingredient in corrosion and mold growth. Air barrier systems help prevent water vapor from being transported by air movement between exteriors and interiors of structures, such as buildings.

The use of air barrier systems has been a requirement in Canada for almost 25 years and is becoming important in North America due to net zero energy requirements by 2030, required by the US Army Corp of Engineering, ASHRAE 90, and International Energy Conservation Code-2009. On Dec. 16, 2011, the DC Construction Codes Coordinating Board (CCCB) adopted the 2012 International Energy Conservation Code (IECC).

Previously known waterproofing sheets having both waterproofing property and moisture permeability have been developed. One typical example of such moisture-permeable waterproofing sheets is flash-spun fabrics. U.S. Pat. No. 3,169,899 (Steuber), for example, discloses a flash-spun fabric. U.S. Pat. No. 3,532,589 (David) discloses a method for producing a flash-spun fabric. The fabric thus obtained has an appropriate pore size to block water but allow water vapor to pass therethrough. A known example of the fabric is commercially available under the trade designation "Tyvek" from E. I. Du Pont de Nemours and Company, Wilmington, Delaware, USA, which is obtained by thermocompressing a three-dimensionally-meshed fiber of high-density polyethylene. Such a moisture-permeable waterproofing sheet can prevent external water from infiltrating through the sheet but can drain gathered moisture as water vapor.

Easy application of the air and water barrier article to substrates, such as building components, may be desirable. For air and water barrier articles having an adhesive coating, WO 2015/126931 (Seabaugh et al.) states that application of air barrier articles is simplified if the release liner comes off on the external face of the air barrier article. This allows for removal of the liner after the air barrier article has been applied to a surface rather than removing the liner before or during the application of the air barrier article.

SUMMARY

We have found that for a roll of air and water barrier sheeting in which the release liner releases from a pressure sensitive adhesive and is retained on the external face of the air and water barrier sheeting, it can be difficult to initiate removal of the liner. However, it can be desirable to remove the liner. For example, if the air and water barrier article is designed to be water vapor permeable, it can be desirable to remove the liner if the liner is not water vapor permeable. Also, removal of the liner can improve lap adhesion in some cases. We now report that a combination of coating compositions between the air and water barrier sheet and the release liner can allow the release liner to release from a pressure sensitive adhesive and be retained on the external face of the air and water barrier sheet but be easily removed after the air and water barrier sheet is in place.

In one aspect, the present disclosure provides a roll including an air and water barrier article having opposing first and second major surfaces, a pressure sensitive adhesive disposed on at least the first major surface of the air and water barrier sheet, first and second coatings compositions disposed on the opposing second major surface of the air and water barrier sheet, and a liner having a first major surface that contacts the first coating composition and the second coating composition. The first coating composition has lower peel adhesion to the first major surface of the liner than the second coating composition has to the first major surface of the liner. The pressure sensitive adhesive contacts a second major surface of the liner when wound in the roll. A peel adhesion between the second major surface of the liner and the pressure sensitive adhesive is less than or equal to the peel adhesion of the second coating composition to the first major surface of the liner.

In another aspect, the present disclosure provides a method of applying an air and water barrier sheet. The method includes unrolling at least a portion of the aforementioned roll, wherein when the roll is unrolled, the liner releases from the pressure sensitive adhesive and remains adhered to at least the second coating composition on the air and water barrier layer. The method further includes adhering the pressure sensitive adhesive to a surface of a building component and peeling the liner away from the first and second coating compositions on the air and water barrier sheet. The peeling is initiated at a location of the first coating composition.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
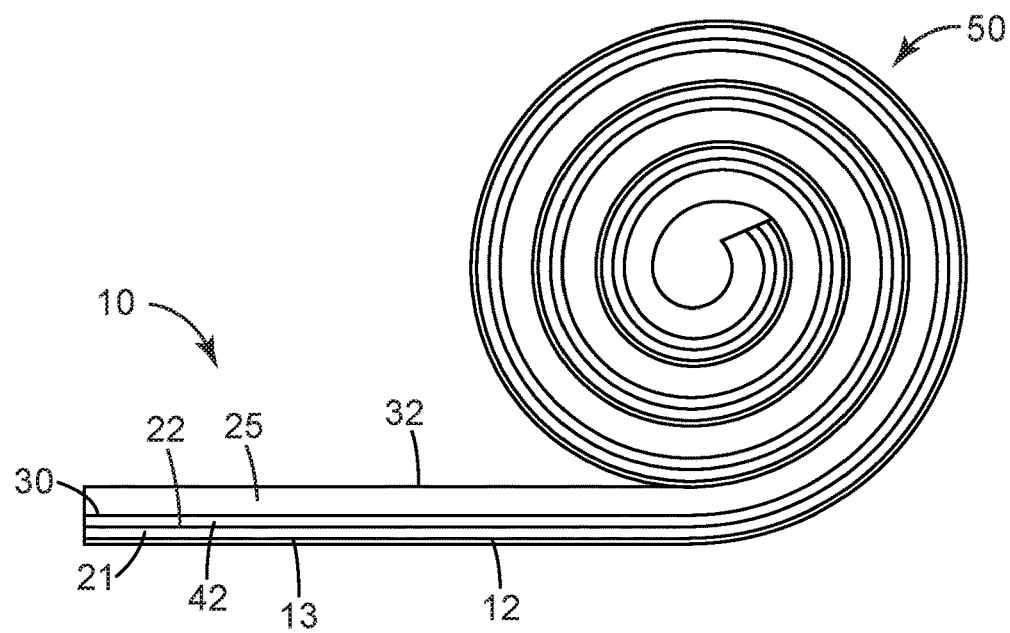
FIG. 1 is a side cross section view of a roll include an air and water barrier sheet, pressure sensitive adhesive, first and second coating compositions, and liner according to the present disclosure.

While the above-identified drawing, which may not be drawn to scale, sets forth various embodiments of the present disclosure, other embodiments are also contemplated, as noted in the Detailed Description. In all cases, this disclosure describes the presently disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

As used in this specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following defined terms, these definitions shall be applied for the entire Specification, including the claims, unless a different definition is provided in the claims or elsewhere in the Specification based upon a specific reference to a modification of a term used in the following Glossary:

Glossary

The words "a", "an", and "the" are used interchangeably with "at least one" to mean one or more of the elements being described.

The term "layer" refers to any material or combination of materials on or overlaying a substrate.

Words of orientation such as "atop, "on," "covering," "uppermost," "overlaying," "underlying" and the like for describing the location of various layers, refer to the relative position of a layer with respect to a horizontally-disposed, upwardly-facing substrate. It is not intended that the substrate, layers or articles encompassing the substrate and layers, should have any particular orientation in space during or after manufacture.

The term "separated by" to describe the position of a layer with respect to another layer and the substrate, or two other layers, means that the described layer is between, but not necessarily contiguous with, the other layer(s) and/or substrate.

The term "(co)polymer" or "(co)polymeric" includes homopolymers and copolymers, as well as homopolymers or copolymers that may be formed in a miscible blend, e.g., by coextrusion or by reaction, including, e.g., transesterification. The term "copolymer" includes random, block, graft, and star copolymers.

The term "water vapor permeable" as used herein means a film having a permeance of more than 1 perm (inch-pounds units) according to ASTM E 96 Procedure A (Desiccant Method).

The term "discontinuous" as used herein means a coating having an interrupted extension along a two dimensional surface. For example, in some embodiments, an air and water barrier sheet having a discontinuous coating of pressure sensitive adhesive does not cover a major surface of a polymeric material or a major surface of a porous layer.

The term "perforated" as used herein means materials allowing passage of liquids at ambient conditions.

The term "microporous" as used herein means a material that is permeable to water vapor, but impermeable to liquid water at 55 cm of water pressure.

The term "air and water barrier" as used herein means material that is designed and constructed to provide the principal plane of air tightness through an environmental separator and that has an air permeance rate no greater than 0.02 L per square meter per second at a pressure difference of 75 Pa when tested in accordance with ASTM E 2178 and is impermeable to liquid water at 55 cm of water pressure.

The phrase "comprises at least one of" followed by a list refers to comprising any one of the items in the list and any combination of two or more items in the list. The phrase "at least one of" followed by a list refers to any one of the items in the list or any combination of two or more items in the list.

Referring now to FIG. 1, the present disclosure provides a roll 50 comprising an air and water barrier article 21 having opposing first and second major surfaces 22, 13, a pressure sensitive adhesive 12 disposed on at least the first major surface 13 of the article 21, a first coating composition 42 disposed on the second major surface 22 of the article 21, and a liner 25 having a first major surface 30 that contacts the first coating composition 42. The pressure sensitive adhesive 12 contacts a second major surface 32 of the liner 25 when wound up in the roll.

FIG. 1 illustrates a roll wound with the pressure sensitive adhesive on the outside of the roll, which is useful for applying the roll to a building component since the roll does not have to first be unwound. In other embodiments, the roll may be wound with the pressure sensitive adhesive on the inside of the roll.

There are two coating compositions (first and second coatings compositions) disposed between the air and water barrier article 21 and the liner 25. In the side, cross-section view illustrated in FIG. 1, only the first coating composition is visible. However, the second coating composition 40 is shown FIGS. 4A, 4B, and 5, which is an end cross-section view of the roll 50 described as multi-layer construction 10. The first coating composition 42 has a first peel adhesion to the first major surface 30 of the liner 25 that is lower than a second peel adhesion, which is the peel adhesion between the second coating composition 40 and the first major surface 30 of the liner 25. The peel adhesion between the second major surface 32 of the liner 25 and the pressure sensitive adhesive 12 is generally less than or equal to the peel adhesion between the first major surface 30 of the liner 25 and the second coating composition 40.

The first coating composition 42 disposed between the second major surface 22 of the article 21 and the first major surface 30 of the liner 25 may be useful, for example, to provide a low release force starter tab for easy removal of the liner 25 from the roll or portion thereof after it is unwound. In some embodiments, the first peel adhesion is less than or equal to 2 Newtons per decimeter.

The peel adhesion between the second major surface 32 of the liner 25 and the pressure sensitive adhesive 12 is measured on a 2.54 cm wide by approximately 20 cm long sample using a peel adhesion tester (Model SP3M90, IMASS Incorporated, Accord, MA) according to 180° Angle Peel Adhesion Test 1 described in the Examples, below. The first and second peel adhesions are measured on a sample of the same size using the same peel tester according to 180° Angle Peel Adhesion Test 2 described in the Examples, below. Although the first and second coating compositions are used in combination in the roll and method of the present disclosure, the first and second peel adhesions can be measured on samples coated with either the first coating composition only or the second coating composition only, and the values can be compared to determine the greater value, which is the second peel adhesion. The second peel adhesion can then be compared to the peel adhesion measured between the second major surface 32 of the liner 25 and the pressure sensitive adhesive 12.

In some embodiments, a ratio of the first peel adhesion to the second peel adhesion is in a range from 1:2 to 1:20, in some embodiments, in a range from 1:3 to 1:15, or from 1:5 to 1:15.

In Examples 32a to 32 g shown in Table 2 in the Example below, the peel adhesion measured on samples including both the first and second coating compositions in different ratios were less than theoretical values that can be calculated by multiplying the peel adhesion values measured for samples having only the first or the second coating composition by the area percent for each of the first and second coating compositions. It is believed that cutting the sample into test samples after coating initiated delamination on the edges of the test samples, and therefore the effective area of the peel front being measured was less than when the coated samples were not cut before adhesion testing.

Qualitatively, determining whether the peel adhesion between the second major surface 32 of the liner 25 and the pressure sensitive adhesive 12 is less than or greater than the second peel adhesion (i.e., peel adhesion between the second coating composition 40 and the first major surface 30 of the liner 25) can typically be determined by unwinding the roll. If the second peel adhesion is greater than the peel adhesion between the second major surface 32 of the liner 25 and the pressure sensitive adhesive 12, typically the liner will release from the pressure sensitive adhesive and remain adhered to at least the second coating composition. Whether the first or second peel adhesion is greater can also be qualitatively determined by hand by determining where it is easier to initiate the peel between the air and water barrier article and the liner.

Liner (25)

Various liners may be useful in roll according to the present disclosure. In some embodiments, the liner comprises at least one of a polyester film, polyethylene film, polypropylene film, polyolefin coated polymer film, polyolefin coated paper, acrylic coated polymer film, and polymer coated kraft paper. The polyolefin coated film or paper may be polyethylene coated film or paper. Examples of suitable commercially available liners include those available under the trade designations "2.0 CL PET U4162/U4162" and "4 BU DHP UE1094B/000" from Loparex, Hammond, Wisconsin, and a red pigmented, multilayer, thermoplastic olefin film containing a proprietary blend of high density polyethylene and low density polyethylene, having a thickness of about 63 micrometers (0.0025 inches), commercially available from Iso Poly Films, Incorporated, Gray Court, South Carolina.

In some embodiments, the liner 25 is coated on at least one of its major surfaces 30, 32 with a release coating. In some embodiments both major surfaces 30, 32 of the liner 25 are coated with a release coating. In this case, the release coating may the same or different on each of the major surfaces 30, 32 of the liner 25. Examples of materials useful as release coatings for the liners disclosed herein include acrylics, silicones, siloxanes, fluoropolymers, and urethanes. For example, in some embodiments, a liner useful in the roll according to the present disclosure is a polyolefin-coated polyester film with silicone treatment on one side, such as those commercially available under the trade designation "48 # CL PET H/H UE1095/000" from Loparex, Hammond, WI. In some embodiments, one side may have a silicone coating and the other an acrylic coating. A silicone coating may be useful for facilitating release of the pressure sensitive adhesive, while the acrylic coating may have higher peel adhesion to at least the second coating composition.

The liner may be produced using a variety of processing techniques. For example, liner processing techniques such as those disclosed in U.S. Pat. Appl. No. 2013/0059105 (Wright et al.) may be useful to produce a liner suitable for practicing the present disclosure. A suitable liner processing technique may include applying a layer comprising a (meth) acrylate-functional siloxane to a major surface of a substrate and irradiating that layer in a substantially inert atmosphere comprising no greater than 500 ppm oxygen with a short wavelength polychromatic ultraviolet light source having at least one peak intensity at a wavelength of from about 160 nanometers to about 240 nanometers. Irradiating can at least partially cure the layer. In some embodiments, the layer is cured at a curing temperature greater than 25° C. The layer may be at a temperature of at least 50° C., 60° C. 70° C., 80° C., 90° C., 100° C., 125° C., or at least 150° C., in some embodiments, no more than 250° C., 225° C., 200° C., 190° C., 180° C., 170° C., 160° C., or 155° C.

In some embodiments, liner can be surface treated (e.g., at least on the first major surface) to increase tack or adhesion between the liner and the second coating composition. Examples of materials or surface treatments useful for increase tack or adhesion between the second coating composition and the first major surface of the liner include any chemical or physical surface modifications to any of the second coating composition, the first major surface of the liner, or both. For example, a chemical surface modifier can be used. In some embodiments, adhesion modification can be accomplished by selecting a specific liner surface morphology to increase surface area and physical interlocking of the coating.

In many embodiments, the liner is impermeable to water vapor. In these embodiments, the liner is typically peeled away from the first and second coating compositions on the air and water barrier article after the air and water barrier article is applied to a surface (e.g., a surface of a building component).

Air and Water Barrier Article (21)

A variety of air and water barrier articles may be useful in the rolls and methods of the present disclosure. In some embodiments, including the embodiment illustrated in FIG. 2A, air and water barrier articles 100 useful for practicing the present disclosure include a porous layer 120 that is at least partially impregnated with a polymeric material 130 where a first major surface 122 of the porous layer 120 is covered (in some embodiments, completely covered) with the polymeric material 130. In some embodiments, these air and water barrier sheets 100 meet the requirements of Modified Test 1 of ASTM D-1970/D-1970M-13, Modified Test 2 of ASTM D-1970/D-1970M-13, Modified Test 3 of ASTM D-1970/D-1970M-14, or combinations thereof. Useful air and water barrier sheets 100 are generally water vapor permeable and barriers to air and water.

Figure 2A:
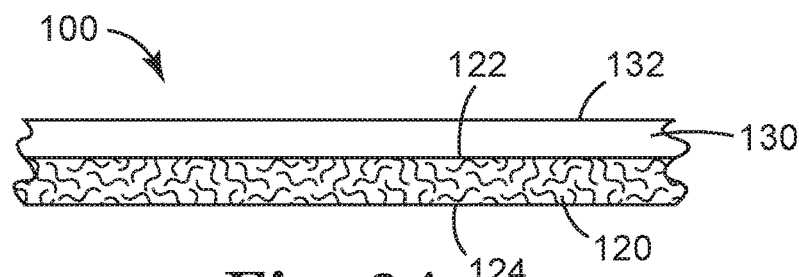
FIG. 2A is a side cross section view of an embodiment of an air and water barrier sheet useful for practicing the present disclosure.
Figure 2B:
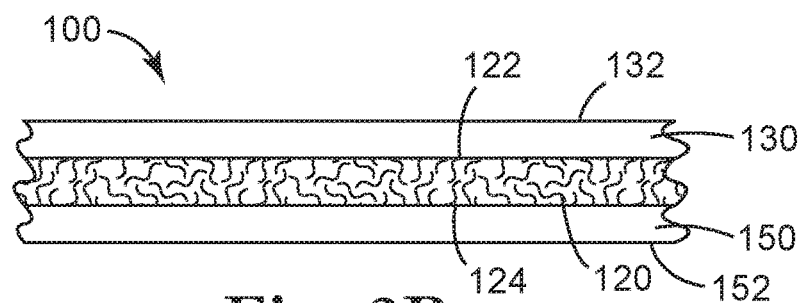
FIG. 2B is a side cross section view of another embodiment of an air and water barrier sheet useful for practicing the present disclosure.

Referring now to FIG. 2B, in some embodiments, presently disclosed air and water barrier articles 100 include a porous layer 120 that is impregnated and encapsulated with the polymeric material 130. In some embodiments, these air and water barrier articles 100, or air and water barrier films made therefrom, meet the requirements of Modified Test 1 of ASTM D-1970/D-1970M-13, Modified Test 2 of ASTM D-1970/D-1970M-13, Modified Test 3 of ASTM D-1970/D-1970M-14, or a combination thereof. In some embodiments, the presently disclosed air and water barrier articles 100, or films made therefrom, are water vapor permeable and barriers to air and water.

The porous layer 120 may comprise a variety of suitable materials including woven webs, non-woven webs, textiles, perforated plastic films, and combinations thereof. The term "non-woven" refers to a material having a structure of individual fibers or threads that are interlaid but not in an identifiable manner such as in a knitted fabric. Examples of non-woven webs include spunbond webs, spunlaced webs, airlaid webs, meltblown web, and bonded carded webs. In some embodiments, the substrate is a fibrous material (e.g., a woven, nonwoven, or knit material). Useful porous layers 120 may be made of natural fibers (e.g., wood or cotton fibers), synthetic fibers (e.g., thermoplastic fibers), or a combination of natural and synthetic fibers. Examples of suitable materials for forming thermoplastic fibers include polyolefins (e.g., polyethylene, polypropylene, polybutylene, ethylene copolymers, propylene copolymers, butylene copolymers, and copolymers and blends of these polymers), polyesters, and polyamides. The fibers may also be multicomponent fibers, for example, having a core of one thermoplastic material and a sheath of another thermoplastic material. In some embodiments, the substrate comprises multiple layers of nonwoven materials with, for example, at least one layer of a meltblown nonwoven and at least one layer of a spunbonded nonwoven, or any other suitable combination of nonwoven materials. For example, the substrate may be a spunbond-meltbond-spunbond, spunbond-spunbond, or spunbond-spunbond-spunbond multilayer material.

In some embodiments, the porous layer is a nonwoven comprising fibers selected from at least one of polyester, polyolefin, polyamide, rayon, and combinations thereof. In some embodiments, the porous layer comprises blown microfibers. In some embodiments, the porous layer includes at least one of extruded netting or scrims. In some embodiments, the porous layer is a woven material.

In some embodiments, the porous layer is a perforated polymeric material. In some embodiments, the perforated polymeric material comprises at least one of polyolefin, oriented polyolefin, polyester, oriented polyester, and multilayer films. Examples of suitable perforated materials are those disclosed in WO 2011/081894 (Scheibner et al.), which is herein incorporated by reference in its entirety.

Figure 3:
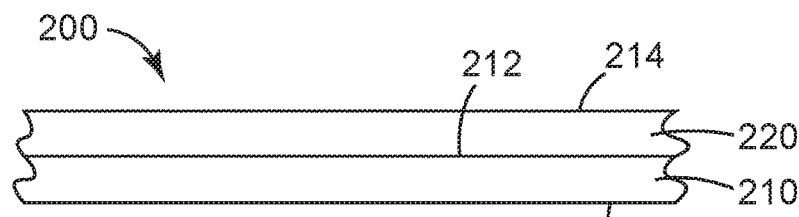
FIG. 3 is a side cross section view of yet another embodiment of an air and water barrier sheet useful for practicing the present disclosure.

Referring now to FIG. 3, in some embodiments, presently disclosed air and water barrier articles 200 include a major surface 212 of a porous layer 210 that is coated with a polymeric material 220, wherein the porous layer 210 comprises a microporous membrane. In some embodiments, these air and water barrier articles 200, or air and water barrier films made therefrom, meet the requirements of Modified Test 1 of ASTM D-1970/D-1970M-13, Modified Test 2 of ASTM D-1970/D-1970M-13, Modified Test 3 of ASTM D-1970/D-1970M-14, or a combination thereof. In some embodiments, the presently disclosed air and water barrier articles 200, or films made therefrom, are water vapor permeable and barriers to air and water.

Suitable microporous membranes include a thermally induced phase separated porous membrane as described in U.S. Pat. No. 5,120,594 (Mrozinski). Such membranes are commercially available under the trade designation "PROPORE" from 3M, St. Paul, MN. Another suitable microporous membrane is a stretched calcium carbonate filled polyolefin film as described in U.S. Pat. No. 4,923,650 (Antoon). Such membranes are commercially available under the trade designation "MICROPRO" from Clopay Plastics, Mason, OH. Suitable microporous membranes further include spunbonded or fibrous bonded polyolefin as described in U.S. Pat. No. 3,532,589 (David) and 5,972,147 (Janis). In some instances, the polyolefins (e.g., polyethylene and polypropylene) are cast, annealed, and then stretched. One suitable microporous membrane is commercially available under the trade designation "TYVEK" from E.I. Du Pont deNemours Corp., Wilmington, Delaware. Other suitable microporous membranes include oriented polymeric films as described in U.S. Pat. No. 5,317,035, (Jacoby et al.) and which comprise ethylene-propylene block copolymers. Such membranes are commercially available under the trade designation "APTRA films" from BP-Amoco Corp., Atlanta, Georgia. Suitable microporous membranes can be formed from immiscible polymer materials or polymer materials that have an extractable component, such as solvent. These materials are stretched after casting.

In some embodiments, the porous layer has a moisture vapor transmission rate of at least 1 perm, at least 5 perms, or at least 10 perms.

A variety of polymeric materials are useful for at least partially impregnating and/or encapsulating the porous layer described above in any of its embodiments to make the air and water barrier sheet in the roll and method according to the present disclosure. In some embodiments, the polymeric material is a polyoxyalkylene polymer having at least one end group derived from an alkoxy silane. The polyoxyalkylene polymer may be silyl terminated. In some embodiments, the polyoxyalkylene polymer further comprises at least one silyl modified branched group.

A production method of a polyoxyalkylene polymer having a reactive silicon group may include those proposed in Japanese Kokoku Publication S45-36319, Japanese Kokoku Publication S46-12154, Japanese Kokai Publication S50-156599, Japanese Kokai Publication S54-6096, Japanese Kokai Publication S55-13767, Japanese Kokai Publication S55-13468, Japanese Kokai Publication S57-164123, Japanese Kokoku Publication H3-2450, U.S. Pat. Nos. 3,632, 557, 4,345,053, U.S. Pat. Nos. 4,366,307, and 4,960,844. Also, useful polymers for the air and water barrier articles useful for the roll and method disclosed herein include polyoxyalkylene polymers having a number average molecular weight of 6,000 or higher and a Mw/Mn ratio of 1.6 or lower and thus having high molecular weight and narrow molecular weight distribution as disclosed in Japanese Kokai Publication S61-197631, Japanese Kokai Publication S61-215622, Japanese Kokai Publication S61-215623, Japanese Kokai Publication S61-218632, Japanese Kokai Publication H3-72527, Japanese Kokai Publication H3-47825, and Japanese Kokai Publication H8-231707.

In some embodiments, the main chain of the polyoxyalkylene polymer may contain other functional groups such as a urethane bond. The aforementioned urethane bond component is not particularly limited and may include a segment (hereinafter, also referred to as an amido segment) produced by reaction of an isocyanato group and an active hydrogen group.

The amido segment can be represented by the following formula:

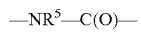

—NR$^5$—C(O)—

(wherein R$^5$ represents a hydrogen atom or a monovalent organic group, desirably a substituted or unsubstituted monovalent $C_{1-20}$ hydrocarbon group, and more desirably a substituted or unsubstituted monovalent $C_{1-8}$ hydrocarbon group).

The aforementioned amido segment may be part of a urethane group produced, for example, by reaction of an isocyanato group and a hydroxy group; a urea group produced by reaction of an isocyanato group and an amino group; and a thiourethane group produced by reaction of an isocyanato group and a mercapto group. Also, in the present disclosure, groups produced by reaction of an active hydrogen in the aforementioned urethane group, urea group, and thiourethane group with another isocyanato group also include a segment represented by the formula —NR$^5$—C(O)—.

Examples of methods for industrially producing a polyoxyalkylene polymer having an amido segment and a reactive silicon group include those disclosed in Japanese Kokoku Publication S46-12154 (U.S. Pat. No. 3,632,557), Japanese Kokai Publications S58-109529 (U.S. Pat. No. 4,374,237), S62-13430 (U.S. Pat. No. 4,645,816), H8-53528 (EP 0676403), and H10-204144 (EP 0831108), Japanese Kohyo Publication 2003-508561 (U.S. Pat. No. 6,197,912), Japanese Kokai Publications H6-211879 (U.S. Pat. No. 5,364,955), H10-53637 (U.S. Pat. No. 5,756,751), H11-100427, 2000-169544, 2000-169545 and 2002-212415, Japanese Patent No. 3,313,360, U.S. Pat. Nos. 4,067,844 and 3,711,445, Japanese Kokai Publications 2001-323040, H11-279249 (U.S. Pat. No. 5,990,257), 2000-119365 (U.S. Pat. No. 6,046,270), S58-29818 (U.S. Pat. No. 4,345,053), H3-47825 (U.S. Pat. No. 5,068,304), H11-60724, 2002-155145, and 2002-249538, WO03/018658, WO03/059981, and Japanese Kokai Publication H6-211879 (U.S. Pat. No. 5,364,955), H10-53637 (U.S. Pat. No. 5,756,751), H10-204144 (EP0831108), 2000-169544, 2000-169545, and 2000-119365 (U.S. Pat. No. 6,046,270).

A (meth) acrylic ester polymer having a reactive silicon group may be added to the polyoxyalkylene polymer having a reactive silicon group, if desired. Various (meth) acrylic ester monomers may be useful for providing the main chain of the (meth) acrylic ester polymer. Examples of useful (meth) acrylic ester monomers include methyl (meth) acrylate, ethyl (meth) acrylate, n-propyl (meth) acrylate, isopropyl (meth) acrylate, n-butyl (meth) acrylate, isobutyl (meth) acrylate, t-butyl (meth) acrylate, n-pentyl (meth) acrylate, n-hexyl (meth) acrylate, cyclohexyl (meth) acrylate, n-heptyl (meth) acrylate, n-octyl (meth) acrylate, 2-ethylhexyl (meth) acrylate, nonyl (meth) acrylate, decyl (meth) acrylate, dodecyl (meth) acrylate, phenyl (meth) acrylate, tolyl (meth) acrylate, benzyl (meth) acrylate, 2-methoxyethyl (meth) acrylate, 3-methoxybutyl (meth) acrylate, 2-hydroxyethyl (meth) acrylate, 2-hydroxypropyl (meth) acrylate, stearyl (meth) acrylate, glycidyl (meth) acrylate, 2-aminoethyl (meth) acrylate, gamma-(methacryloyloxypropyl) trimethoxysilane, gamma-(methacryloyloxypropyl) dimethoxymethylsilane, methacryloyloxymethyltrimethoxysilane, methacryloyloxymethyltriethoxysilane, methacryloyloxymethyldimethoxymethylsilane, methacryloyloxymethyldiethoxymethylsilane, ethylene oxide adduct of (meth) acrylic acid, trifluoromethylmethyl (meth) acrylate, 2-trifluoromethylethyl (meth) acrylate, 2-perfluoroethylethyl (meth) acrylate, 2-perfluoroethyl-2-perfluorobutylethyl (meth) acrylate, perfluoroethyl (meth) acrylate, trifluoromethyl (meth) acrylate, bis (trifluoromethyl) methyl (meth) acrylate, 2-trifluoromethyl-2-perfluoroethylethyl (meth) acrylate, 2-perfluorohexylethyl (meth) acrylate, 2-perfluorodecylethyl (meth) acrylate, and 2-perfluorohexadecylethyl (meth) acrylate.

With respect to the (meth) acrylic ester polymer, vinyl monomers can be copolymerized together with a (meth) acrylic ester monomer. Examples of suitable vinyl monomers include styrene monomers such as styrene, vinyltoluene, alpha-methylstyrene, chlorostyrene, styrenesulfonic acid and its salts; fluorine-containing vinyl monomers such as perfluoroethylene, perfluoropropylene, and vinylidene fluoride; silicon-containing vinyl monomers such as vinyltrimethoxysilane and vinyltriethoxysilane; maleic anhydride, maleic acid, and monoalkyl and dialkyl esters of maleic acid; fumaric acid, and monoalkyl and dialkyl esters of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; nitrile group-containing vinyl monomers such as acrylonitrile and methacrylonitrile; amido group-containing vinyl monomers such as acrylamide and methacrylamide; vinyl esters such as vinyl acetate, vinyl propionate, vinyl pivalate, vinyl benzoate, and vinyl cinnamate; alkenes such as ethylene and propylene; conjugated dienes such as butadiene and isoprene; and vinyl chloride, vinylidene chloride, allyl chloride, and allyl alcohol. Any of these monomers may be used alone or any combination of them may be copolymerized with the (meth) acrylic ester monomer. In some embodiments, polymers comprising a styrene monomer and/or a (meth) acrylic acid monomer are desirable. In the above descriptions, (meth) acrylic acid means acrylic acid and/or methacrylic acid.

The (meth) acrylic ester polymer can be prepared, for example, by a conventionally known method. For example, a "living radical polymerization" method can be conveniently employed in order to obtain a (meth) acrylic ester polymer having narrow molecular weight distribution and low viscosity and having a reactive silicon group at a molecular chain end at a high ratio. An "atom transfer radical polymerization" method is a living radical polymerization method useful for polymerizing a (meth) acrylic ester monomer using, for example, an organic halide or a halogenated sulfonyl compound as an initiator and a transition metal complex as a catalyst. An atom transfer radical polymerization method advantageously has a wide range of options for the initiator and the catalyst. Because a halogen is located at a molecular chain end, which is relatively advantageous for a functional group conversion reaction, the atom transfer radical polymerization method is useful as a production method of the (meth) acrylic ester polymer having a specified functional group. Examples of the atom transfer radical polymerization method include the method disclosed in Krzysztof Matyjaszewski et al., J. Am. Chem. Soc, vol. 117, p. 5614 (1995) and the method disclosed in Japanese Kokai Publication H9-272714.

Other examples of a production method of the (meth) acrylic ester polymer having a reactive silicon group are production methods employing free radical polymerization methods using chain transfer agents and disclosed in Japanese Kokoku Publication H3-14068, Japanese Kokoku Publication H4-55444, and Japanese Kokai Publication H6-211922. The above-mentioned (meth) acrylic ester polymers having a reactive silicon group may be used alone or two or more kinds of them may be used in combination.

Example of methods for producing an organic polymer involving blending a polyoxyalkylene polymer having a reactive silicon group with a (meth) acrylic ester polymer having a reactive silicon group include those disclosed in Japanese Kokai Publication S59-122541, S63-11264, H6-172631, and H11-116763. Further, a production method for a polyoxyalkylene polymer obtained by blending the (meth) acrylic ester polymer having a reactive silicon group may also include a method of polymerizing a (meth) acrylic ester monomer in the presence of a polyoxyalkylene polymer having a reactive silicon group. Examples of these methods include those disclosed in Japanese Kokai Publication 559-78223, Japanese Kokai Publication S59-168014, Japanese Kokai Publication S60-228516, and Japanese Kokai Publication 560-228517.

Some of the silyl terminated polymers useful in the air and water barrier sheets in the roll and method of the present disclosure are commercially available, for example, from Kaneka Corporation under the trade designations "KANEKA MS POLYMER" and "KANEKA SILYL", and from Union Carbide Specialty Chemicals Division under the trade designations "SILMOD-SAT10", "SILMOD SAT30", "SILMOD SAT 200", "SILMOD S203", "SILMOD S303", "SILMOD 20A". It has been reported that resins available under the trade designation "SILMOD" have substantially the same chemistries as some resins available under the trade designations "MS" and "SILYL" from Kanegafuchi Kagaku Kogyo Kabushiki Kaisha, Osaka Japan. For example, the composition available under trade designation "SILMOD S203" corresponds to the composition available under trade designation "MS S203", the composition available under trade designation "SILMOD S303" corresponds to the composition available under trade designation "MS S303", and the composition available under trade designation "SILMOD 20A" corresponds to the composition available under trade designation "MS 20A". In further examples, the composition available under the trade designation "SILMOD SAT10" corresponds to the composition available under the trade designation "SILYL SAT10", the composition available under the trade designation "SILMOD SAT30" corresponds to the composition available under the trade designation "SILYL SAT30", and the composition available under the trade designation "SILMOD 200" corresponds to the composition available under the trade designation "SILYL 200".

Materials useful as polymeric materials for the air and water barrier articles include solid materials and foam materials. In some embodiments, the foam material includes closed cell foams.

Polymeric materials useful for at least one of impregnating or encapsulating porous materials to make air and water barrier sheets useful for the roll and method of the present disclosure may optionally include various additives such as dehydrating agents, rheology additives, compatibilizers, tackifiers, physical property modifiers, photocurable substances, oxygen-curable substances, storage stability improving agents, fillers, epoxy resins, epoxy resin curing agents antioxidants, adhesion promoters, ultraviolet absorbers, metal deactivators, antiozonants, antioxidants, light stabilizers, lubricants, amine type radical chain inhibitors, phosphorus-containing peroxide decomposers, lubricants, pigments, foaming agents, solvents, flame retardants, antifungal agents, blowing agents, and antistatic agents, each in an adequate amount. These additives may be added singly to the polymeric material or two or more thereof may be added in combination to the polymeric material. Specific examples of these additives are disclosed in publications such as Japanese Kokoku Publications H4-69659 and H7-108928 and Japanese Kokai Publications S63-254149, S64-22904, 2001-72854, and 2008-303650.

In the polymeric materials useful for at least one of impregnating or encapsulating porous materials to make air and water barrier sheets useful for the roll and method of the present disclosure, at least one of UV stabilizers or antioxidants may be present in an amount from 0 to 5 parts per 100 parts of the silyl terminated polymer. These materials improve heat stability and UV resistance. Some useful UV stabilizers and antioxidants are commercially available, for example, those available under the trade designations "TINUVIN 770", "TINUVIN 327", "TINUVIN 1130" and "TINUVIN 292" from BASF, Florham Park, NJ.

In some embodiments, the polymeric materials useful for practicing the present disclosure include at least 0.1 wt %, in some embodiments, at least 0.5 wt %, of one or more water scavengers, and at most 5 wt %, in some embodiments at most 2 wt %, of one or more water scavengers. Examples of suitable water scavengers include silanes such as vinyltrimethoxysilane, vinyltriethoxysilane, vinylmethyldimethoxysilane, O-methylcarbamatomethyl-methyldimethoxysilane, O-methylcarbamatomethyl-trimethoxysilane, O-ethylcarbamatomethyl-methyldiethoxysilane, O-ethylcarbamatomethyl-triethoxysilane, 3-methacryloyloxypropyl-trimethoxysilane, methacryloyloxymethyltrimethoxysilane, methacryloyloxymethylmethyldimethoxysilane, methacryloyloxymethyltriethoxysilane, methacryloxymethylmethyl-diethoxysilane, 3-acryloxyoylpropyl-trimethoxysilane, acryloyloxymethyltrimethoxysilane, acryloyloxymethylmethyldimethoxysilane, acrylmethyltriethoxysilane, acryloyloxymethylmethyldiethoxysilane, alkylalkoxysilanes in general, and further functionalized organosilanes and other aminosilanes, which are also described below as adhesion promoters.

In some embodiments, the polymeric materials useful for practicing the present disclosure include at least 0.1 wt %, in some embodiments, at least 0.5 wt %, of one or more adhesion promoters. In some embodiments, the presently disclosed polymeric materials include at most 5 wt %, in some embodiments, at most 2 wt %, of one or more adhesion promoters. Useful adhesion promoters include those available under the trade designations "A1120", "A187", and "A189" from OSI and "Z9020" from Dow Chemical. Amino silanes can be used as adhesion promoters. Examples of amino silane useful as adhesion promoters include gamma-aminopropyltrimethoxysilane, gamma-aminopropyltriethoxysilane, gamma-aminopropyltriisopropoxysilane, gamma-aminopropylmethyldimethoxysilane, gamma-aminopropylmethyldiethoxysilane, gamma-(2-aminoethyl) aminopropyltrimethoxysilane, gamma-(2-aminoethyl) aminopropylmethyldimethoxysilane, gamma-(2-aminoethyl) aminopropyltriethoxysilane, gamma-(2-aminoethyl) aminopropylmethyldiethoxysilane, gamma-(2-aminoethyl) aminopropyltriisopropoxysilane, gamma-(6-aminohexyl) aminopropyltrimethoxysilane, 3-(N-ethylamino)-2-methylpropyltrimethoxysilane, 2-aminoethylaminomethyltrimethoxysilane, N-cyclohexylaminomethyltriethoxysilane, N-cyclohexylaminomethyldiethoxymethylsilane, gamma-ureidopropyltrimethoxysilane, gamma-ureidopropyltriethoxysilane, N-phenyl-gamma-aminopropyltrimethoxysilane, N-phenylaminomethyltrimethoxysilane, N-benzyl-gamma-aminopropyltrimethoxysilane, N-vinylbenzyl-gamma-aminopropyltriethoxysilane, [Nu], [Nu]'-bis[3-trimethoxysilyl]propyl]ethylenediamine, N-cyclohexylaminomethyltrimethoxysilane, N-cyclohexylaminomethyldimethoxymethylsilane, and N-phenylaminomethyltrimethoxysilane.

In some embodiments, the polymeric materials useful for practicing the present disclosure may comprise one or more catalysts. The catalyst may be present in the polymeric material in an amount of from about 0.05 wt % to about 5 wt %, in some embodiments from about 0.1 wt % to about 2 wt %, and in some embodiments, from about 0.1 wt % to about 1 wt %. Useful catalysts include organometallic compounds which are known as silanol condensation catalysts. The silanol condensation catalyst may be used in an amount of from about 0.01 to about 20 parts by weight per 100 parts by weight of the silyl-terminated polymer, in some embodiments, from about 0.1 to about 10 parts by weight per 100 parts by weight of the silyl-terminated polymer. Examples of suitable silanol condensation catalysts include titanate esters such as tetrabutyl titanate and tetrapropyl titanate; organotin compounds such as dibutyltin dilaurate, dibuytltin maleate, dibutyltin diacetate, stannous octylate, stannous napthenate, reaction products from dibutyltin oxide and phthalate esters, and dibutyltin diacetylacetonate; organoaluminum compounds such as aluminum trisacetylacetonate, aluminum tris(ethylacetoacetate) and diisopropocyaluminum ethyl acetoacetate; reaction products from bismuth salts and organic carboxylic acids, such as bismuth tris(2-ethylhexonate) and bismuth tris(neodecanoate); chelate compounds such as zirconium tetra-acetylacetonate and titanium tetra-acetylactonate; organolead compounds such as lead octylate; organovanadium compounds; amines such as butylamine, octylamine, dibutylamine, monoethanolamine, oleylamine, cyclohexylamine, benzylamine, diethylaminopropylamine, xylenediamine, triethylenediamine, guanidine, diphenylguanidine, 2,4,6-tris(dimethylaminomethyl) phenol, morpholine, N-methylmorpholine, 2-ethyl-4-methylimidazole with carboxylic or other acids; low-molecular-weight polyamide resins derived from excess polyamines and polybasics acids; and reaction products from excess polyamines and epoxy compounds. Any of these may be used individually or in combination.

In some embodiments, polymeric materials useful for practicing the present disclosure comprise one or more pigments or fillers. Useful fillers are typically solids that are non-reactive with the other components of the polymeric material, porous material, and coating compositions. Useful fillers include, for example, clay, talc, dye particles, pigments and colorants (for example, titanium dioxide and carbon black), glass beads, metal oxide particles, silica particles, ceramic microspheres, hollow polymeric microspheres (such as those available under the trade designation "EXPANCEL 551 DE" from Akzo Nobel, Duluth, Ga.), hollow glass microspheres (such as those available under the trade designation "K37" from Minnesota Mining and Manufacturing Co., St Paul, Minn.), carbonates, metal oxides, silicates (e.g. talc, asbestos, clays, mica), sulfates, silicon dioxide, and aluminum trihydrate.

Some specific examples include ground or light calcium carbonate (with or without a surface-treatment such as a fatty acid, resin acid, cationic surfactant, or anionic surfactant); magnesium carbonate; talc; sulfates such as barium sulfate; alumina; metals in powder form (e.g., aluminum, zinc and iron); bentonite; kaolin clay; quartz powder; and combinations of two or more of these.

Examples of useful organic pigments include halogenated copper phthalocyanines, aniline blacks, anthraquinone blacks, benzimidazolones, azo condensations, arylamides, diarylides, disazo condensations, isoindolinones, isoindolines, quinophthalones, anthrapyrimidines, flavanthrones, pyrazolone oranges, perinone oranges, beta-naphthols, BON arylamides, quinacridones, perylenes, anthraquinones, dibromanthrones, pyranthrones, diketopyrrolo-pyrrole pigments (DPP), dioxazine violets, copper and copper-free phthalocyanines, and indanthrones.

Examples of useful inorganic pigments include titanium dioxide, zinc oxide, zinc sulphide, lithopone, antimony oxide, barium sulfate, carbon black, graphite, black iron oxide, black micaceous iron oxide, brown iron oxides, metal complex browns, lead chromate, cadmium yellow, yellow oxides, bismuth vanadate, lead chromate, lead molybdate, cadmium red, red iron oxide, Prussian blue, ultramarine, cobalt blue, chrome green (Brunswick green), chromium oxide, hydrated chromium oxide, organic metal complexes, and laked dye pigments.

The filler can also comprise conductive particles (see, for example, U.S. Patent Application Pub. No. 2003/0051807, which is incorporated herein by reference) such as carbon particles or metal particles of silver, copper, nickel, gold, tin, zinc, platinum, palladium, iron, tungsten, molybdenum, solder or the like, or particles prepared by covering the surface of these particles with a conductive coating of a metal. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal.

In some embodiments, the polymeric material includes inorganic solids such as talc, titanium dioxide, silica, zirconia, calcium carbonate, calcium magnesium carbonate, glass or ceramic microspheres, or combinations thereof. In some embodiments, the polymeric material includes at least one of titanium dioxide or calcium carbonate.

In some embodiments, the polymeric material useful for practicing the present disclosure comprises a plasticizer. In some of these embodiments, the plasticizer does not contain any groups reactive toward silane/alkoxysilane. Examples of suitable plasticizers for the polymeric material include which polyethers, polyether esters, esters of organic carboxylic acids or anhydrides thereof, such as phthalates (e.g., dialkyl phthalates such as di-(2-ethyl-hexyl)-pthhalates, dibutyl phthalate, diethyl phthalate, dioctyl phthalate, butyl octyl phthalate, dicyclohexyl phthalate, butyl benzyl phthalate, dioctyl phthalate, diisononyl phthalate, and diisodecyl phthalate); adipates (e.g., di-(2-ethylhexyl) adipate, diisooctyl adipate, octyl decyladipate; and dioctyl adipate); alkyl azelates (e.g., di (2-ethylhexyl) azelate and di-(2-ethylbutyl) azelate); and dialkyl sebacates (e.g., dibutyl sebacate, dioctylsebacate, and diisooctyl sebacate). Other suitable plasticizers include phosphates such as triaryl phosphates (e.g., tricresyl phosphate, triphenyl phosphate, cresyl (liphenyl phosphate); trialkyl phosphates (e.g., trioctyl phosphate and tributyl phosphate); alkoxyalkyl phosphates (e.g., trisbutoxyethyl phosphate); and alkyl aryl phosphates (e.g., octyldiphenyl phosphate); citrates such as acetyl tri-n-butyl citrate, acetyl triethyl citrate, monoisopropyl citrate, triethyl citrate, mono-, di-, and tri-stearyl citrate; triacetin; p-tert-butyl; n-octyl benzoate; 2-ethylhexyl benzoate; isooctyl benzoate; n-nonyl benzoate; n-decyl benzoate; isodecyl benzoate; 2-propylheptyl benzoate; n-undecyl benzoate; isoundecyl benzoate; n-dodecyl benzoate; isododecyl benzoate; isotridecyl benzoate; n-tridecyl benzoate; triisononyl trimellitate; $C_{13}$-rich $C_{11}$-$C_{14}$-alkyl benzoates, and combinations thereof. In some embodiments, plasticizers useful for practicing the present disclosure include esters, such as triethylene glycol bis (2-ethylhexanoate) commercially available under the trade designation "Eastman TEG-EH" from Eastman. In some embodiments, at least one of diethylene glycol monobenzoate, diethylene glycol dibenzoate, propylene glycol monobenzoate, propylene glycol dibenzoate, polypropylene glycol monobenzoate, polypropylene glycol dibenzoate can be used individually or in combination with any of the aforementioned plasticizers.

The amount of plasticizer employed, if one is employed, will depend on the nature of the polymeric resin and the plasticizer.

The polymeric material useful for practicing the present disclosure may comprise one or more organic solvents. Examples of suitable solvents include non-reactive compounds which may be aliphatic, aromatic, or araliphatic. Examples of suitable solvents include methoxypropyl acetate, methoxyethyl acetate, ethylene glycol diacetate, propylene glycol diacetate, glyme, diglyme, dioxane, tetrahydrofuran, dioxolane, tert-butyl methyl ether, ethyl acetate, butyl acetate, chloroform, methylene chloride, chlorobenzene, o-dichlorobenzene, anisole, 1,2-dimethoxybenzene, phenyl acetate, N-methyl-2-pyrrolidone, dimethylformamide, N,N-dimethylacetamide, dimethyl sulphoxide, acetonitrile, phenoxyethyl acetate, and combinations of two or more of these. In some embodiments, the solvent comprises at least one of methoxypropyl acetate, acetone, 2-butanone, xylene, toluene, cyclohexanone, 4-methyl-2-pentanone, 1-methoxyprop-2-yl acetate, ethylene glycol monomethyl ether, 3-methoxy-n-butyl acetate, white spirit, more highly substituted aromatics such as those commercially available, for example, under the trade designations "NAPTHA", "SOLVESSO", "ISOPAR", "NAPPAR" from Deutsche EXXON CHEMICAL GmbH, Cologne, DE; "SHELLSOL" from Deutsche Shell Chemie GmbH, Eschborn, DE; methyl n-amyl ketone ("MAK") and "AROMATIC 100" "AROMATIC 150" from ExxonMobile Chemical; xylene, methyl isobutyl ketone ("MIBK"), and ethyl 3-ethoxypropionate from Eastman Chemical Company.

Additional compositions useful for the polymeric material in the air and water barrier article useful for practicing the present disclosure can be found in Int. Pat. Appl. Pub. Nos. WO 2015/126931 (Seabaugh et al.) and WO 2015/183354 (Widenbrant et al.), the examples of which are incorporated herein by reference.

Pressure Sensitive Adhesive (12)

In some embodiments, the air and water barrier articles are self-adhering, comprising an adhesive material, in some embodiments, a pressure sensitive adhesive material. Referring again to FIGS. 2A, 2B, and 3, in some embodiments, air and water barrier articles 100, 200 useful in the roll and method of the present disclosure include a layer of pressure sensitive adhesive (PSA) useful for adhering the air and water barrier articles 100, 200 to various surfaces. PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power.

In some embodiments, including embodiments illustrated in FIGS. 2A and 3, the air and water barrier articles 100, 200 useful in the roll and method of the present disclosure include a pressure sensitive adhesive disposed on at least one of or only one of a second major surface 124, 216 of the porous layer 120, 210 or a major surface 132, 214 of the polymeric material 130, 220. In some embodiments, the pressure sensitive adhesive is discontinuously disposed on at least one of or only one of the aforementioned surfaces 124, 132, 216, 214 in a random manner. In some embodiments, the pressure sensitive adhesive is discontinuously disposed on at least one of or only one of the aforementioned surfaces 124, 132, 216, 214 in a patterned manner. In some embodiments, the pressure sensitive adhesive covers at least one of 10% to 90% of the second major surface 124, 216 of the porous layer 120, 210, 10% to 90% of the major surface 132, 214 of the polymeric material 130, 220, or 10% to 90% of both the second major surface 124, 216 of the porous layer 120, 210 and the major surface 132, 214 of the polymeric material 130, 220. In some embodiments, the pressure sensitive adhesive covers only one of 10% to 90% of the second major surface 124, 216 of the porous layer 120, 210 or 10% to 90% of the major surface 132, 214 of the polymeric material 130, 220 but not both. In some embodiments, the pressure sensitive adhesive is a permeable pressure sensitive adhesive that is continuously disposed on at least one of a second major surface 124, 216 of the porous layer 120, 210, a major surface 132, 214 of the polymeric material 130, 220, or combinations thereof. In some embodiments, the pressure sensitive adhesive is a permeable pressure sensitive adhesive that is continuously disposed on only one of a second major surface 124, 216 of the porous layer 120, 210 or a major surface 132, 214 of the polymeric material 130, 220 but not both.

In some embodiments, including the embodiment illustrated in FIG. 2B, the pressure sensitive adhesive is disposed on at least one or only one of the outer major surfaces 132, 152 of the polymeric material 130, 150. In some embodiments, the pressure sensitive adhesive is discontinuously disposed on at least one or only one of the outer major surfaces 132, 152 of the polymeric material 130, 150. In some embodiments, the pressure sensitive adhesive is discontinuously disposed on at least one or only one of the outer major surfaces 132, 152 of the polymeric material 130, 150 in a random manner. In some embodiments, the pressure sensitive adhesive is discontinuously disposed on at least one or only one of the outer major surfaces 132, 152 of the polymeric material 130, 150 in a patterned manner. In some embodiments, the pressure sensitive adhesive covers 10% to 90% of the surface area of the outer major surfaces 132, 152 of the polymeric material 130, 150. In some embodiments, the pressure sensitive adhesive covers 10% to 90% of the surface area of only one of the outer major surfaces 132, 152 of the polymeric material 130, 150. In some embodiments, the pressure sensitive adhesive is a permeable pressure sensitive adhesive that is continuously disposed on at least one or only one outer major surface 132, 152 of the polymeric material 130, 150.

If a water vapor permeable pressure sensitive adhesive is used, the air and water barrier article may be completely coated on one side. If a water vapor impermeable pressure sensitive adhesive is used, then the air and water barrier article may be only partially coated with adhesive, typically in the range of about 10% to 90%, more typically about 30% to 80%, most typically 40% to 70%, of the surface area of the article. In other words, at least 10% to 90%, in some embodiments 20% to 70% or 30% to 60%, of the surface area of the air and water barrier article is typically adhesive-free in order to maintain sufficient water vapor permeability of the article.

A variety of pressure sensitive adhesives are useful for adhering air and water barrier articles to architectural structures (e.g., buildings) and building components, for example. These include both water vapor permeable and water vapor impermeable pressure sensitive adhesives. An example of the latter is a rubber modified asphalt (bitumen) pressure sensitive adhesive or a synthetic rubber pressure sensitive adhesive. Such pressure sensitive adhesives are well known in the art and understood to be water vapor impermeable. Further examples of suitable PSAs include natural rubber-, acrylic-, block copolymer-, silicone-, polyisobutylene-, polyvinyl ether-, polybutadiene-, or and urea-based pressure sensitive adhesive and combinations thereof. These PSAs can be prepared, for example, as described in *Adhesion and Adhesives Technology*, Alphonsus V. Pocius, Hanser/Gardner Publications, Inc., Cincinnati, Ohio, 1997, pages 216 to 223, *Handbook of Pressure Sensitive Adhesive Technology*, Donatas Satas (Ed.), 2nd Edition, Van Nostrand Reinhold, New York, NY, 1989, Chapter 15, and U.S. Pat. No. Re 24,906 (Ulrich).

In some embodiments, the adhesive is selected to be a solventless or hot melt adhesive. In some embodiments, solvent based adhesives or water based adhesives may be used. Examples of suitable adhesives include radiation-cured (e.g., ultraviolet (UV) radiation or electron-beam cured (co)polymers resulting from polymerizable monomers or oligomers) may be used. Suitable hot melt adhesives may contain (co)polymers such as butyl rubber, styrene-butadiene-styrene (SBS), styrene-isoprene-styrene (SIS), styrene butadiene (SB), styrene-ethylene-butadiene-styrene (SEBS), and ethylene/vinylacetate (EVA). Tackifying resins, which generally refer to materials that are compatible with the elastomer and have a number average molecular weight of up to 10,000 grams per mole, are typically added to these elastomers. Useful tackifying resins can have a softening point of at least 70° C. as determined using a ring and ball apparatus and a glass transition temperature of at least −30° C. as measured by differential scanning calorimetry. In some embodiments, the tackifying resin comprises at least one of rosin, a polyterpene (e.g., those based on α-pinene, β-pinene, or limonene), an aliphatic hydrocarbon resin (e.g., those based on cis- or trans-piperylene, isoprene, 2-methylbut-2-ene, cyclopentadiene, dicyclopentadiene, or combinations thereof), an aromatic resin (e.g. those based on styrene, α-methyl styrene, methyl indene, indene, coumarone, or combinations thereof), or a mixed aliphatic-aromatic hydrocarbon resin. Any of these tackifying resins may be hydrogenated (e.g., partially or completely). Natural and petroleum waxes, oil, and bitumen may be useful as additives to the pressure sensitive adhesive composition.

In some embodiments, PSAs compositions that are useful in the roll and method according to the present disclosure are acrylic PSAs. As used herein, the term "acrylic" or "acrylate" includes compounds having at least one of acrylic or methacrylic groups. Useful acrylic PSAs can be made, for example, by combining at least two different monomers including certain of the second monomers described above. Examples of suitable second monomers include 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, isononyl acrylate, and methacrylates of the foregoing acrylates. Examples of suitable additional monomers useful for preparing acrylic PSAs include a (meth)acrylic acid (e.g., acrylic acid, methacrylic acid, itaconic acid, maleic acid, and fumaric acid), a (meth)acrylamide (e.g., acrylamide, methacrylamide, N-ethyl acrylamide, N-hydroxyethyl acrylamide, N-octyl acrylamide, N-t-butyl acrylamide, N,N-dimethyl acrylamide, N,N-diethyl acrylamide, N-ethyl-N-dihydroxyethyl acrylamide, and methacrylamides of the foregoing acrylamides), a (meth)acrylate (e.g., 2-hydroxyethyl acrylate or methacrylate, cyclohexyl acrylate, t-butyl acrylate, isobornyl acrylate, and methacrylates of the foregoing acrylates), N-vinyl pyrrolidone, N-vinyl caprolactam, an alpha-olefin, a vinyl ether, an allyl ether, a styrenic monomer, or a maleate. In some embodiments, the PSA in the composition according to the present disclosure includes a pendent carboxylic acid group incorporated into the PSA by including, for example, acrylic acid, methacrylic acid, itaconic acid, maleic acid, or fumaric acid in the preparation of the PSA.

Acrylic PSAs may also be made by including cross-linking agents in the formulation. Examples of cross-linking agents include copolymerizable polyfunctional ethylenically unsaturated monomers (e.g., 1,6-hexanediol diacrylate, trimethylolpropane triacrylate, pentaerythritol tetraacrylate, and 1,2-ethylene glycol diacrylate); ethylenically unsaturated compounds which in the excited state are capable of abstracting hydrogen (e.g., acrylated benzophenones such as described in U.S. Pat. No. 4,737,559 (Kellen et al.), p-acryloxy-benzophenone, which is available from Sartomer Company, Exton, PA, monomers described in U.S. Pat. No. 5,073,611 (Rehmer et al.) including p-N-(methacryloyl-4-oxapentamethylene)-carbamoyloxybenzophenone, N-(benzoyl-p-phenylene)-N'-(methacryloxymethylene)-carbodiimide, and p-acryloxy-benzophenone); nonionic crosslinking agents which are essentially free of olefinic unsaturation and is capable of reacting with carboxylic acid groups, for example, in the third monomer described above (e.g., 1,4-bis(ethyleneiminocarbonylamino) benzene; 4,4-bis(ethyleneiminocarbonylamino) diphenylmethane; 1,8-bis(ethyleneiminocarbonylamino) octane; 1,4-tolylene diisocyanate; 1,6-hexamethylene diisocyanate, N,N'-bis-1,2-propyleneisophthalamide, diepoxides, dianhydrides, bis (amides), and bis (imides)); and nonionic crosslinking agents which are essentially free of olefinic unsaturation, are noncopolymerizable with the first and second monomers, and, in the excited state, are capable of abstracting hydrogen (e.g., 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s- triazine; 2,4-bis(trichloromethyl)-6-(2,4-dimethoxy)phenyl)-s-triazine; 2,4-bis(trichloromethyl)-6-(3-methoxy) phenyl)-s-triazine as described in U.S. Pat. No. 4,330,590 (Vesley); 2,4-bis(trichloromethyl)-6-naphthenyl-s-triazine and 2,4-bis(trichloromethyl)-6-(4-methoxy) naphthenyl-s-triazine as described in U.S. Pat. No. 4,329,384 (Vesley)).

Typically, the second monomer is used in an amount of 80-100 parts by weight (pbw) based on a total weight of 100 parts of copolymer, and an additional monomer as described above is used in an amount of 0-20 pbw based on a total weight of 100 parts of copolymer. The crosslinking agent can be used in an amount of 0.005 to 2 weight percent based on the combined weight of the monomers, for example from about 0.01 to about 0.5 percent by weight or from about 0.05 to 0.15 percent by weight.

The acrylic PSAs useful for practicing the present disclosure can be prepared, for example, in solvent or by a solvent free, bulk, free-radical polymerization process (e.g., using heat, electron-beam radiation, or ultraviolet radiation). Such polymerizations are typically facilitated by a polymerization initiator (e.g., a photoinitiator or a thermal initiator). Examples of suitable polymerization initiators include an of those described above for the preparation of the ultraviolet light-absorbing oligomer. The polymerization initiator is used in an amount effective to facilitate polymerization of the monomers (e.g., 0.1 part to about 5.0 parts or 0.2 part to about 1.0 part by weight, based on 100 parts of the total monomer content).

If a photocrosslinking agent is used, the coated adhesive can be exposed to ultraviolet radiation having a wavelength of about 250 nm to about 400 nm. The radiant energy in this range of wavelength required to crosslink the adhesive is about 100 millijoules/cm$^2$ to about 1,500 millijoules/cm$^2$, or more specifically, about 200 millijoules/cm$^2$ to about 800 millijoules/cm$^2$.

A useful solvent-free polymerization method is disclosed in U.S. Pat. No. 4,379,201 (Heilmann et al.). Initially, a mixture of second and third monomers can be polymerized with a portion of a photoinitiator by exposing the mixture to UV radiation in an inert environment for a time sufficient to form a coatable base syrup, and subsequently adding a crosslinking agent and the remainder of the photoinitiator. This final syrup containing a crosslinking agent (e.g., which may have a Brookfield viscosity of about 100 centipoise to about 6000 centipoise at 23° C., as measured with a No. 4 LTV spindle, at 60 revolutions per minute) can then be coated onto a substrate, for example, a polymeric film substrate. Once the syrup is coated onto the substrate, for example, the polymeric film substrate, further polymerization and crosslinking can be carried out in an inert environment (e.g., nitrogen, carbon dioxide, helium, and argon, which exclude oxygen). A sufficiently inert atmosphere can be achieved by covering a layer of the photoactive syrup with a polymeric film, such as silicone-treated PET film, that is transparent to UV radiation or e-beam and irradiating through the film in air.

Solvent-based adhesives may contain ingredients such as those listed above, dissolved or dispersed in a solvent vehicle. Water based adhesives would normally be based on emulsions of (co)polymeric materials. Suitable (co)polymeric materials include vinyl acetate and (meth)acrylic homopolymers and copolymers the phrase "(meth)acrylic homopolymers and copolymers" is typically used to mean homopolymers and copolymers of one or more (meth) acrylic esters (and acids) only, ethylene/vinyl acetate as well as styrene/acrylic, vinyl chloride/acrylic, vinyl versatate and others. Water based adhesives may have the disadvantage that they generally require the additional use of drying ovens or heat lamps to evaporate the water.

The adhesive may suitably be applied to the air and water barrier article at a thickness of 0.001 inches to 0.1 inch (about 0.0254-2.54 mm). In some embodiments, the pressure sensitive adhesive is applied at a thickness of 0.003 inches to 0.025 inches (about 0.0762-0.635 mm) or at a thickness of 0.005 inches to 0.02 inches (about 0.127-0.508 mm).

Adhesive Patterns

In some embodiments, the pressure sensitive adhesive is impermeable to water vapor. In some of these embodiments, to retain a desired level of water vapor permeance in the air and water barrier articles, the adhesive is applied to the air and water barrier article in a discontinuous manner in order to leave portions of the major outer surface of the air and water barrier article uncoated with adhesive.

In order to prevent the lateral movement of air between the air and water barrier article and the substrate to which it is bonded, and through lap joints of the air and water barrier article, the adhesive coated areas of the air and water barrier article can be made to intersect to isolate the uncoated areas, thereby eliminating channels through which air can laterally move. This can be achieved by any number of patterns, such as intersecting circles with adhesive free centers, intersecting squares or rectangles of adhesive, intersecting strips in a checkered pattern, etc.

The adhesive may suitably be applied so as to cover 5% to 99% of the area of one side of the air and water barrier article. In some embodiments, it is applied to cover between 10% and 90% of the area, in some embodiments between 30% to 80% or 40% to 70% of the area, to obtain a balance of adhesion and water vapor permeance for the article.

Partial coatings of adhesive may be applied in a random fashion or in a specific pattern. Some examples of partial coatings of adhesive are described, for example, in U.S. Pat. No. 3,039,893 (Banigan, Jr.), U.S. Pat. No. 3,426,754 (Bierenbaum), U.S. Pat. No. 5,374,477 (Lawless), U.S. Pat. No. 5,593,771 (Lawless), U.S. Pat. No. 5,895,301 (Porter), U.S. Pat. No. 6,495,229 (Carte), and U.S. Pat. No. 6,901,712 (Lionel). In some embodiments, the adhesive is provided from dispensing outlets on a first distribution manifold and a second distribution manifold. The first distribution manifold can move while the second distribution manifold is kept stationary. Further details about this method can be found, for example, in Int. Pat. Appl. Pub. No. WO 2015/126645 (Maier et al.) and WO 2015/126931 (Seabaugh et al.), the disclosure of which is incorporated by reference in its entirety herein.

First and Second Coating Compositions (42, 40)

The first and second coating compositions have different peel adhesions to the first major surface of the liner. At least one of the first or second coating composition may be useful for reducing tack or adhesion between the second major surface of the article and the first major surface of the liner. Generally, the first and second coating compositions are not tacky and therefore would not be considered PSAs.

Useful first and second coating compositions include any of a variety of materials that are typically non-tacky and can be disposed between the second major surface of the article and the first major surface of the liner. Examples of suitable coating compositions include inks, release coatings, and slip coatings. In some embodiments, at least one of the first and second coating compositions comprises at least one of a polyamide, a polyurethane, a silyl-terminated polyether, a vinyl polymer, an acrylic polymer, or a nitrocellulose polymer. A useful silyl-terminated polyether can be prepared as a polymeric material described above, for example, and increasing the amount of inorganic filler in the polymeric material can decrease its peel adhesion to the liner.

In some embodiments, first and second coating compositions can be selected from commercially available materials. For example, useful coating compositions include a liquid, white ink available under the trade designation "DT OPAQUE WHITE" from Sun Chemical Corporation, Carlstadt, New Jersey, a liquid, red ink available under the trade designation "SUNSPECTRO SB TRUWEATHER YS RED" from Sun Chemical Corporation, a vinyl, white ink available under the trade designation 13W1541 SOLVENT VINYLWHITE from Penn Color, Doylestown, PA, a water-based ink dispersion of titanium dioxide and binder resin, available under the trade designation SPPFW1836936/G267 from Sun Chemical Corporation, a water-based polyurethane dispersion, available under the trade designation PERMAX 202 from The Lubrizol Corporation, Cleveland, OH, and a solvent-based polyamide primer, available under the trade designation POLYURETHANE PROTECTIVE TAPE ADHESION PROMOTER 86A from 3M Company, St. Paul, MN.

Figure 4A:
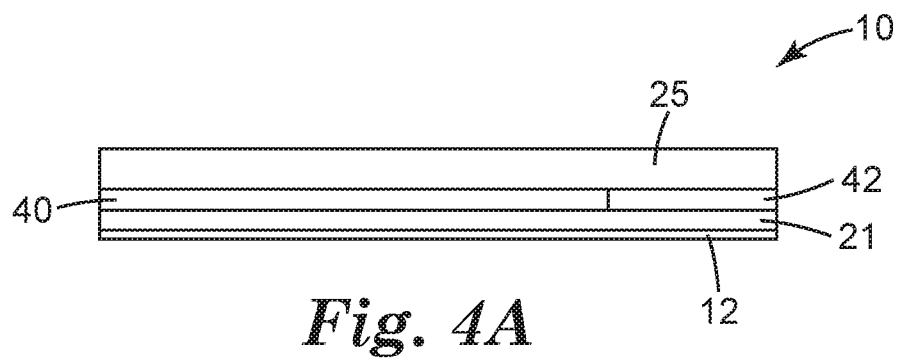
FIG. 4A is an end cross section view of an embodiment of a roll according to the present disclosure having first and second coating compositions.
Figure 4B:
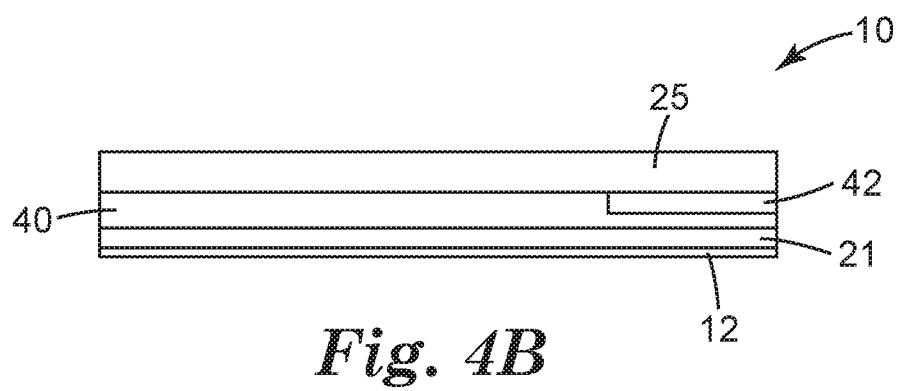
FIG. 4B is an end cross section view of another embodiment of a roll according to the present disclosure having first and second coating compositions.

Referring now to FIGS. 4A and 4B, in some embodiments, a first coating composition 42 and a second coating composition 40 are disposed between the liner 25 and the air and water barrier article 21. First coating composition 42 and second coating composition 40 can be positioned in various configurations, but both of them typically contact liner 25. As shown in FIG. 4A, first and second coating compositions (42 and 40, respectively) can be positioned next to and adjacent to one another between the liner 25 and the air and water barrier article 21 to provide two different release forces between the liner 25 and the air and water barrier article 21 when looking at an end cross section of a roll disclosed herein.

As shown in FIG. 4B, in some embodiments, first coating composition 42 can be positioned adjacent to a portion of second coating composition 40 and on top of a portion of second coating composition 40. First and second coating compositions (42 and 40, respectively) of this embodiment are still disposed between the liner 25 and the air and water barrier article 21. Also, the second coating composition can be dispensed to leave an uncoated strip. A flood coating of the first coating composition could then be coated over the second coating composition and the uncoated strip.

Figure 5:
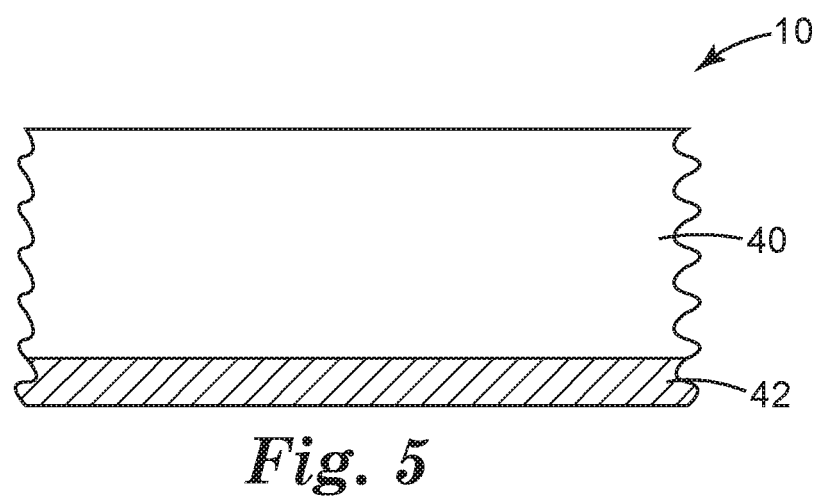
FIG. 5 is a top view of two coating compositions in a portion of a roll according to the present disclosure.

As shown in FIG. 5, when viewing a top plan view of a cross section of the multilayer article 10 disclosed in FIGS. 4A and 4B underneath liner 25, first coating composition 42 extends along one side of the article 10 in the machine direction and second coating composition 40 extends the opposite side of the article 10 in the machine direction. In some embodiments, including the illustrated embodiment, the first coating composition forms at least one continuous strip extending along the length of the roll. In some embodiments, at least one of the first coating composition or the second coating composition is discontinuous. In some embodiments, including the illustrated embodiment, the first and second coating compositions completely cover the air and water barrier article 21. In some embodiments, a portion of the air and water barrier article 21 directly contacts the first major surface of the liner.

In some embodiments, the first and second coating compositions have different colors, which allow the areas on the roll having the different coating compositions to be readily distinguished.

In some embodiments, such as those shown in FIGS. 4A, 4B and 5, a particular ratio of the area occupied by the second coating composition to area occupied by the first coating composition can be useful in obtaining a desired ease of release of the pressure sensitive adhesive from the second major surface of the liner and a desired ease of separation of the first major surface of the liner from the air and water barrier article. In some embodiments, the second coating composition occupies a greater area than the first coating composition. In these embodiments, a ratio of an area of the second coating compositions to an area of the first coating composition is more than 1:1. In some embodiments, a ratio of an area of the second coating composition to an area of the first coating composition is at least 2:1. In some embodiments, useful ratios of the area of the second coating composition 40 to the area of the first coating composition 42 ranges from 2:1 to 30:1. In some embodiments, useful ratios of the area of the second coating composition 40 to the area of the first coating composition 42 include 14:1, 6.5:1, and 29:1. The areas of the first and second coating compositions can be understood to mean the surface area of the second major surface of the air and water barrier article that is covered by the first and second coating compositions, respectively. When the first and second coating compositions are provided in continuous strips (e.g., in the machine direction), the areas of the first and second coating compositions (including the area ratios in any of the embodiments described above) are equivalent to the widths of the strips in the cross-direction of the roll.

In some embodiments in which the second peel adhesion is particularly high, the first coating composition may occupy a greater area than the second coating composition. In these cases, the second peel adhesion may be strong enough to cause the liner to preferentially adhere to the first and second coating compositions instead of the pressure sensitive adhesive even when a relatively small amount of the second coating composition is present. Also, when the liner has a relatively high modulus, the second peel adhesion may be strong enough to cause the liner to preferentially adhere to the first and second coating compositions instead of the pressure sensitive adhesive even when a relatively small amount of the second coating composition is present.

In some embodiments, for the preferential release of the liner from the pressure sensitive adhesive when the roll is unwound, the peel adhesion is described by the following equation:

the first peel adhesion (the fraction of the peel front provided by the first coating composition)+
the second peel adhesion (the fraction of the peel front provided by the second coating composition)
≥ the peel adhesion of the second major surface of the liner to the pressure sensitive adhesive. Again, in these embodiments, when the first and second coating compositions are provided in continuous strips (e.g., in the machine direction), the fractions of the peel front provided by the first and second coating compositions are equivalent to the widths of the strips in the cross-direction of the roll. In other embodiments, the fractions of the peel front provided by the first and second coating compositions can be calculated from the surface area of the second major surface of the air and water barrier article that is covered by the first and second coating compositions, respectively. The peel adhesions can be determined as described above.

Any suitable coating method may be useful for applying the first and second coating compositions to the air and water barrier article and/or the liner. For example, spray coating and gravure coating may be useful. In some embodiments, first coating compositions are applied down the side edges of an air and water barrier web and in a center strip. The coated web can then be laminated to a liner and pattern-coated with pressure sensitive adhesive on the opposite side using one of the methods described above. Advantageously, the web can be cut down the center and wound into two individual rolls, each having a continuous strip of the first coating composition down each edge. Alternatively, at least one of the air and water barrier article or the liner having the final desired with for the roll can be coated with the first and second coating compositions and pressure sensitive adhesive layer.

Applications

In some embodiments, the air and water barrier article in the roll and method of the present disclosure is useful for building envelope applications. In some embodiments, the air and water barrier article is adhered to a building component. Examples of building components include exterior sheathing, exterior cladding, roofing deck, attic surfaces, boundaries between walls, boundaries between roof systems, and foundation surfaces. Examples of exterior sheathing materials include plywood, oriented strand board (OSB), gypsum board, foam insulation sheathing, glass mat faced gypsum sheathing board, and other conventional sheathing materials commonly used in the construction industry. Useful exterior cladding layer is made up of brick, concrete blocks, reinforced concrete, stone, vinyl siding, fiber cement board, clapboard, and other known exterior siding materials. In some embodiments, the air and water barrier article is applied to a roofing deck, an attic floor or other attic surface, a boundary between a wall, roof system, and/or foundation, other interior or exterior surfaces of a structure, or used as flashing around a roof penetration, windows, and doors. Building components include panels and other constructions before, during, or after they become part of an architectural structure.

The method of the present disclosure includes adhering at least a portion of the pressure sensitive adhesive on the roll in any of the above embodiments to a surface of an building component, so that the air and water barrier article is affixed to the surface of the building component and unrolling at least a portion of the roll. When the roll is unwound, the liner releases from the pressure sensitive adhesive and remains adhered to at least the second coating composition on the air and water barrier article (and in some cases the first coating composition) even when a peel adhesion between the second major surface of the liner and the pressure sensitive adhesive is equal to the second peel adhesion. Adhering the roll to the building component can be carried out before or after the roll is unwound. In some embodiments, the roll is adhered to the building component before it is unwound. In some embodiments, the roll is at least partially unwound before it is adhered to the building component. In embodiments in which the roll is wound with the pressure sensitive adhesive on the inside of the roll, the roll may be unwound at least partially before the roll is adhered to the building component.

Next the liner can be peeled away from the first and second coating compositions on the air and water barrier article. The first coating composition provides a useful location for initiating the peeling away of the liner. Peeling the liner away from the first and second coating composition is optional and depends on whether a water vapor permeable liner is used and whether water vapor permeability is desired.

In some embodiments of the roll and the method of the present disclosure, including embodiments in which the roll is used in building envelope applications, the width of the roll is at least 10 centimeters, at least 45 centimeters or at least 75 centimeters.

Openings in building components (e.g., windows and doors) are not flat. It is difficult to form a waterproofing layer only with a waterproofing sheet, and therefore the opening is often finished with a waterproofing tape with a pressure sensitive adhesive layer provided thereon. Rolls and methods according to the present disclosure can also be useful for these applications. In some embodiments, the width of the roll is at least 1.9 centimeters or at least 2.5 centimeters. In some embodiments, the width of the roll is at least 5 centimeters. In some embodiments, the width of the roll is at most 10 centimeters.

Mechanical fasteners or adhesive fasteners, such as pressure sensitive adhesive tapes, can be used to affix the moisture-permeable waterproofing sheet on substrates of exterior walls or to affix overlapped portions of two moisture-permeable waterproofing sheets. As a result, moisture may permeate from gaps of such fasteners, such as nail holes or pressure sensitive adhesive tapes, over a long period of time. In some embodiments, the air and water barrier article and the pressure sensitive adhesive together form a construction that passes ASTM D-1970/D-1970M-13 or similar modified tests such as Modified Test 1 of ASTM D-1970/D-1970M-13, Modified Test 2 of ASTM D-1970/D-1970M-13, or Modified Test 3 of ASTM D-1970/D-1970M-14 for nail sealability.

In some embodiments of the roll and method of the present disclosure, the air and water barrier article and the pressure sensitive adhesive together form a construction that is water vapor permeable. In some embodiments, the air and water barrier article and the pressure sensitive adhesive together form a construction that has a moisture vapor transmission rate of 1 perms or more according to ASTM E96 method. In some embodiments, the air and water barrier article and the pressure sensitive adhesive together form a construction that has a moisture vapor transmission rate of 5 perms or more according to ASTM E96 method. In some embodiments, the air and water barrier article and the pressure sensitive adhesive together form a construction that has a permeability of greater than 10 perms according to ASTM E96. In some embodiments, thicknesses of the different layers used in the air and water barrier article are varied to achieve desired permeability of the article.

Advantageously, the roll according to the present disclosure and useful for the method disclosed herein can be unwound without using a low adhesion backsize coating, which can improve lap adhesion and compatibility with other building materials. Instead a liner useful as a release liner for the pressure sensitive adhesive is built in to the roll and is separated and subsequently removed from the roll after installation of the air and water barrier article. Use of the roll is simplified by not requiring removal of a release liner before the installation of the air and water barrier article. The first and second coating compositions can provide and visual indication of the removable liner and can provide an initiation tab for removal of the liner. Without the first and second coating compositions, it may be difficult to see that there is a liner attached to the roll and to initiate the separation of the liner from the roll, which can cause both product failure and frustration for the installer.

SOME EMBODIMENTS OF THE PRESENT DISCLOSURE

In a first embodiment, the present disclosure provides a roll comprising:

an air and water barrier article having opposing first and second major surfaces and a length;
a pressure sensitive adhesive disposed on at least the first major surface of the air and water barrier article;
a first coating composition and a second coating composition disposed on the opposing second major surface of the air and water barrier article; and
a liner having a first major surface that is in contact with the first coating composition and the second coating composition, wherein the first coating composition has a first peel adhesion to the first major surface of the liner that is lower than a second peel adhesion of the second coating composition to the first major surface of the liner,
wherein the pressure sensitive adhesive contacts a second major surface of the liner when wound in the roll, and wherein a peel adhesion between the second major surface of the liner and the pressure sensitive adhesive is less than or equal to the second peel adhesion.

In a second embodiment, the present disclosure provides the roll of the first embodiment, wherein a sum of
the first peel adhesion times the fraction of the peel front provided by the first coating composition and
the second peel adhesion times the fraction of the peel front provided by the second coating composition
is greater than or equal to the peel adhesion of the second major surface of the liner and the pressure sensitive adhesive.

In a third embodiment, the present disclosure provides the roll of any one of the first or second embodiments, wherein the second coating composition occupies a greater area than the first coating composition.

In a fourth embodiment, the present disclosure provides the roll of any one of the first to third embodiments, wherein a ratio of an area of the second coating composition to an area of the first coating composition is at least 2:1.

In a fifth embodiment, the present disclosure provides the roll of any one of the first to fourth embodiments, wherein the first peel adhesion is less than or equal to 2 Newtons per decimeter.

In a sixth embodiment, the present disclosure provides the roll of any one of the first to fifth embodiments, wherein a ratio of the first peel adhesion to the second peel adhesion is in a range from 1:2 to 1:20.

In a seventh embodiment, the present disclosure provides the roll of any one of the first to sixth embodiments, wherein the pressure sensitive adhesive is disposed on only the first major surface of the air and water barrier article.

In an eighth embodiment, the present disclosure provides the roll of any one of the first to seventh embodiments, wherein the first coating composition forms at least one continuous strip extending along the length of the roll.

In a ninth embodiment, the present disclosure provides the roll of any one of the first to eighth embodiments, wherein at least one of the first coating composition or the second coating composition is discontinuous.

In a tenth embodiment, the present disclosure provides the roll of any one of the first to ninth embodiments, wherein at least one of the first or second coating compositions comprises at least one of a polyamide, a polyurethane, a silyl-terminated polyether, a vinyl polymer, an acrylic polymer, or a nitrocellulose polymer.

In an eleventh embodiment, the present disclosure provides the roll of any one of the first to tenth embodiments, wherein the liner comprises at least one of a polyester film, polyethylene film, polypropylene film, a polyolefin coated polymer film, polyolefin coated paper, an acrylic coated polymer film, and polymer coated kraft paper.

In a twelfth embodiment, the present disclosure provides the roll of any of the first to eleventh embodiments, wherein at least one of the first major surface of the liner or the second major surface of the liner comprises a release coating.

In a thirteenth embodiment, the present disclosure provides the roll of the twelfth embodiment, wherein the liner is derived from applying a layer comprising a (meth)acrylate-functional siloxane to a major surface of a substrate; and irradiating said layer, in a substantially inert atmosphere comprising no greater than 500 ppm oxygen, with a short wavelength polychromatic ultraviolet light source having at least one peak intensity at a wavelength of from about 160 nanometers to about 240 nanometers to at least partially cure the layer, optionally wherein the layer is at a curing temperature greater than 25° C.

In a fourteenth embodiment, the present disclosure provides the roll of any one of the first to thirteenth embodiments, wherein the liner is water vapor impermeable.

In a fifteenth embodiment, the present disclosure provides the roll of any one of the first to fourteenth embodiments, wherein the air and water barrier article and the pressure sensitive adhesive together form a construction that is water vapor permeable.

In a sixteenth embodiment, the present disclosure provides the roll of any one of the first to fifteenth embodiments, wherein the air and water barrier article and the pressure sensitive adhesive together form a construction that passes Modified Test 1 of ASTM D-1970/D-1970M-13, Modified Test 2 of ASTM D-1970/D-1970M-13, or Modified Test 3 of ASTM D-1970/D-1970M-14.

In a seventeenth embodiment, the present disclosure provides the roll of any one of the first to sixteenth embodiments, wherein the air and water barrier layer comprises a porous layer at least partially impregnated with a polymeric material, and wherein a first major surface of the porous layer is covered with the polymeric material.

In an eighteenth embodiment, the present disclosure provides the roll of any one of the first to sixteenth embodiments, wherein the article comprises a porous layer at least partially impregnated and encapsulated with a polymeric material.

In a nineteenth embodiment, the present disclosure provides the roll of any one of the first to sixteenth embodiments, wherein the article comprises a major surface of a porous layer that is coated with a polymeric material.

In a twentieth embodiment, the present disclosure provides the roll of any one of the seventeenth to nineteenth embodiments, wherein the polymeric material comprises a polyoxyalkylene polymer having at least one end group derived from an alkoxy silane.

In a twenty-first embodiment, the present disclosure provides the roll of the twentieth embodiment, wherein all of the end groups of the polyoxyalkylene polymer are silyl terminated.

In a twenty-second embodiment, the present disclosure provides the roll of the twentieth or twenty-first embodiment, wherein the polyoxyalkylene polymer further comprises at least one silyl modified branched group.

In a twenty-third embodiment, the present disclosure provides the roll of any one of the seventeenth to twenty-second embodiments, wherein the polymeric material is foamed.

In a twenty-fourth embodiment, the present disclosure provides the roll of the twenty-third embodiment, wherein the polymeric material comprises a closed cell foam.

In a twenty-fifth embodiment, the present disclosure provides the roll of any one of the first to twenty-fourth embodiments, wherein a width of the roll is at least 1.9 centimeters.

In a twenty-sixth embodiment, the present disclosure provides the roll of any one of the first to twenty-fourth embodiments, wherein a width of the roll is at least 2.5 centimeters.

In a twenty-seventh embodiment, the present disclosure provides the roll of any one of the first to twenty-fourth embodiments, wherein a width of the roll is at least 10 centimeters.

In a twenty-eighth embodiment, the present disclosure provides the roll of any one of the first to twenty-sixth embodiments, wherein a width of the roll is less than 10 centimeters.

In a twenty-ninth embodiment, the present disclosure provides the roll of any one of the first to twenty-fourth embodiments, wherein a width of the roll is at least 45 centimeters.

In a thirtieth embodiment, the present disclosure provides the roll of any one of the first to twenty-ninth embodiments, wherein the article is used in building envelope applications.

In a thirty-first embodiment, the present disclosure provides the roll of any one of the first to thirtieth embodiments, wherein the article is used in building envelope applications.

In a thirty-second embodiment, the present disclosure provides an air and water barrier film cut from the roll of any one of the first to thirty-first embodiments.

In a thirty-third embodiment, the present disclosure provides the air and water barrier film of the thirty-second embodiment disposed on a major surface of a building component.

In a thirty-fourth embodiment, the present disclosure provides a method of applying an air and water barrier article, the method comprising:

adhering at least a portion of the pressure sensitive adhesive on the roll of any one of the first to third-second embodiment to a surface of an building component, so that the air and water barrier article is affixed to the surface of the building component; and unwinding at least a portion of the roll, wherein during the unwinding, the liner releases from the pressure sensitive adhesive and remains adhered to at least the second coating composition on the air and water barrier article.

In a thirty-fifth embodiment, the present disclosure provides the method of the thirty-fourth embodiment, further providing peeling the liner away from the first and second coating compositions on the air and water barrier article, wherein peeling is initiated at a location of the first coating composition.

Embodiments of the present disclosure have been described above and are further illustrated below by way of the following Examples, which are not to be construed in any way as imposing limitations upon the scope of the present disclosure. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

| | Materials |
|---|---|
| KANEKA MS POLYMER S203H | A liquid, silyl-terminated polyether derived from a polyether polymer backbone and having methyldimethoxysilane functional groups and a viscosity of 6000 to 10,000 centiPoise, available under the trade designation KANEKA MS POLYMER S203H from Kaneka North America, LLC, Pasadena, TX. |
| AEROSIL R202 | A hydrophobic fumed silica after treated with a polydimethylsiloxane, available under the trade designation AEROSIL R202 from Evonik Corporation, Parsippany, NJ. |
| OMYACARB 5-FL | A beneficiated calcium carbonate having a mean particle size of 6.3 micrometers and a calcium carbonate content of 98%, available under the trade designation OMYACARB 5-FL from Omya Incorporated, Cincinnati, OH. |
| TIONA 696 | A non-chalking, chlorie-process rutile titanium dioxide pigment having a titanium dioxide content of 92%, and a surface treatment of alumina, silica, organic, available under the trade designation TIONA 696 from Cristal, Hunt Valley, MD. |
| DYNASYLAN DAMO-T | A liquid, bifunctional organosilane having two reactive amino groups and hydrolyzable inorganic methoxysilyl groups, available under the trade designation DYNASYLAN DAMO-T from Evonik Corporation, Parsippany, NJ. |
| DYNASYLAN VTMO | A liquid, bifunctional organosilane having a reactive vinyl group and a hydrolyzable inorganic trimethoxysilyl group, available under the trade designation DYNASYLAN VTMO from Evonik Corporation, Parsippany, NJ. |

-continued

| | Materials |
|---|---|
| NEOSTAN U-220H | A liquid catalyst based on dibutyl tin bis(acetylacetoacetonate) having a tin content of 27.5%, available under the trade designation NEOSTAN U-220H from Nitto Kasei Company, Ltd., Osaka, Japan. |
| REEMAY 2024 | A spunbond polyester fabric having an areal weight of 71.4 grams/square meter, a thickness of 0.31 millimeters, and a TEXTEST Air Perm of (1626 liters/second)/square meter (320 cubic feet/minute)/square foot), available under the trade designation REEMAY 2024 from Fiberweb Filtration Business, Old Hickory, TN. |
| IRGACURE 651 | 2-dimethoxy-2-phenylacetophenone, a photoinitiator available under the trade designation IRGACURE 651 from available from BASF Corporation, Florham Park, NJ. |
| FORAL 85LB | A glycerol ester of highly hydrogenated wood rosin, available under the trade designation FORAL 85 LB from Pinova Incorporated, Brunswick GA. |
| RELEASE LINER 1 | A 0.004 in. (102 micrometer) thick, 58 pound polycoated Kraft paper release liner having a silicone acrylate release coating on both sides was prepared using the process described in Example 61 of US 20130059105. |
| RELEASE LINER 2 | A 51 micrometer (0.002 inch) thick, polyester film having a silicone treatment on both sides, available as 2.0 CL PET U4162/U4162 from Loparex, Hammond, WI. |
| RELEASE LINER 3 | A 102 micrometer (0.004 in.) thick, high density polyethylene film with silicone treatment on one side, available as 4 BU DHP UE1094B/000 from Loparex, Hammond, WI. |
| RELEASE LINER 4 | A red pigmented, multilayer, thermoplastic olefin film containing a proprietary blend of high density polyethylene and low density polyethylene, having a thickness of about 63 micrometers (0.0025 inches), obtained from Iso Poly Films, Incorporated, Gray Court, SC. |
| RELEASE LINER 5 | A 51 micrometer (0.002 inch) thick untreated polyester film. |
| RELEASE LINER 6 | A 77 micrometer (0.003 in.) thick, polyolefin-coated polyester core with silicone treatment on one side, available under the trade designation 48# CL PET H/H UE1095/000 from Loparex, Hammond, WI. |
| RELEASE LINER 7 | An 89 micrometer (0.0035 inch) thick, cast polypropylene film having one glossy side and one matte side. |
| RELEASE LINER 8 | A polyester film having a thickness of 36 micrometers (0.0014 inches) and having a polyolefin primer on one side and silicone treatment on the opposite side, available under the trade designation 2PAKN from Mitsubishi Polyester Film, Incorporated, Greer, SC. |
| RELEASE LINER 9 | RELEASE LINER 6 was coated on the non-siliconized side according to Synthesis Example 1 of US 2013/0004749 A1, except that a gravure coater was used in place of a Meyer bar. |
| INK 1 | A liquid, urethane white ink, available under the trade designation DT OPAQUE WHITE from Sun Chemical Corporation, Carlstadt, NJ. |
| INK 2 | A liquid, acrylic red ink, available under the trade designation SUNSPECTRO SB TRUWEATHER YS RED from Sun Chemical Corporation, Carlstadt, NJ. INK 2 was different from INKs 3, 4, and 5. |
| INK 3 | A liquid dispersion of red pigment, solvent, and binder resin, obtained from Sun Chemical Corporation, Carlstadt, N.J., under the trade designation R3804-95D.. |
| INK 4 | A liquid dispersion of red pigment, solvent, and binder resin, obtained from Sun Chemical Corporation, Carlstadt, N.J., under the trade designation SOLIMAX, R3804-95C. |
| INK 5 | A liquid dispersion of red pigment, solvent, and binder resin, obtained from Sun Chemical Corporation, Carlstadt, N.J., under the trade designation SOLVAPLAST 901, R3804-95A. |
| INK 6 | A liquid dispersion of titanium dioxide pigment in a vinyl resin in a solvent blend of n-propyl acetate and n-butyl acetate, available under the trade designation 13W1541 SOLVENT VINYLWHITE from Penn Color, Doylestown, PA. |
| INK 7 | A water based ink dispersion of titanium dioxide and binder resin, available under the trade designation SPPFW1836936/G267 from Sun Chemical Corporation, Carlstadt, NJ. |
| COATING 1 | A water based polyurethane dispersion, available under the trade designation PERMAX 202 from The Lubrizol Corporation, Cleveland, OH. |

-continued

| Materials | |
|---|---|
| COATING 2 | A solvent based polyamide primer, available under the trade designation POLYURETHANE PROTECTIVE TAPE ADHESION PROMOTER 86A from 3M Company, St. Paul, MN. |

Test Methods
Nail Sealability

Nail sealability of air and water barrier articles was evaluated generally as described in ASTM D-1970/D-1970M-13: "Standard Specification for Self-Adhering Polymer Modified Bituminous Sheet Materials Used as Steep Roofing Underlayment for Ice Dam Protection", Paragraph 7.9: "Self Sealability. Head of Water Test" with some modifications. All materials were conditioned at (23° C. (73° F.)) for at least 24 hours prior to use. Two different modified tests were employed. Samples were considered to have passed the test if a rating of "A" or "B" was achieved.

Modified Test Method 1 of ASTM D-1970/D-1970M-13

A plywood substrate having a thickness of 1.25 cm (0.5 inches) was employed; four nails were driven through the air and water barrier article into the plywood substrate until 6.35 millimeters (0.25 inches) remained above the exposed surface of the air and water barrier article; and a red dye was added to the water. After exposure the surface of plywood substrate in contact with the air and water barrier article (referred to herein as the "topside"), and the surface of the plywood substrate opposite the topside (referred to herein as the "bottomside") were inspected visually by unaided eye for signs of water leakage as determined by the presence of red-stained areas around each of the four nails. Such stained areas would be indicative of failure of the air and water barrier article to form a seal around the nails. Samples were rated "A" if 3 or 4 of the nail areas on the plywood substrate were free of dye staining; "B" if 2 of the nail areas on the plywood substrate were free of dye staining; and "C" if 1 or 0 of the nail areas on the plywood substrate were free of dye staining.

Modified Test Method 2 of ASTM D-1970/D-1970M-13

Modified Test 2 was conducted in the same manner as Modified Test 1 with the following change. The four nails were driven through the air barrier article into the plywood substrate until the nail head contacted the top surface of the air and water barrier article, then the nail was backed out until 6.35 millimeters (0.25 inches) remained above the exposed surface of the air and water barrier article.

Modified Test Method 3 of ASTM D-1970/D-1970M-14

Modified Test 3 was conducted in the same manner as Modified Test 2 with the following change. The nails were not backed out, but left in contact with the top surface of the air and water barrier article.

Moisture Vapor Transmission

Moisture vapor transmission of air and water barrier article s was evaluated generally as described in ASTM E96/E96M-13: "Standard Test Methods for Water Vapor Transmission of Materials" using Paragraph 11: Dessicant Method at (23° C. (73° F.)) and 50% relative humidity, with the following modifications. One specimen was evaluated, with the pressure sensitive adhesive facing into the Petri dish; six data points were obtained and used to calculate a permeance value. The six individual values were used to determine an average permeance value which was reported in units of Perms.

180° Angle Peel Adhesion Test 1 (Easy Side Release=Adhesive Strength)

The 180 degree peel adhesion strength between the release liner and pattern coated pressure sensitive adhesive, also referred to herein as the "easy side release", was measured on a laminate of release liner/pattern coated pressure sensitive adhesive/porous layer. Adhesive strength was measured after aging for seven days at 23° C. and 50% relative humidity. A 2.54 cm wide by approximately 20 cm (1 in. by 8 in.) long sample of the laminate was cut using a specimen razor cutter. The exposed release liner surface was attached lengthwise to the previously cleaned aluminum platen surface of a peel adhesion tester (Model SP3M90, IMASS Incorporated, Accord, MA). The laminate was then rolled down one time in one direction with a 2 kg (4.4 lb.) rubber roller at a rate of 230 cm/minute (90 in/min.). The pressure sensitive adhesive/porous layer was carefully lifted away from the release liner adhered to the platen surface, doubled-back at an angle of 180 degrees, and secured to the clamp of the peel adhesion tester. The 180 degree angle peel adhesion strength was then measured as the pressure sensitive adhesive/porous layer was peeled from the release liner at a rate of 230 cm/min (90 in/min). A minimum of two test specimens were evaluated with results obtained in ounces (oz)/inch which were used to calculate the average release strength. Release testing was conducted under Condition A described in 180° Angle Peel Adhesion Test 2 (Tight Side Release=Liner Release) below.

180° Angle Peel Adhesion Test 2 (Tight Side Release=Liner Release)

The 180 degree peel adhesion strength between the release liner and polymeric material, also referred to herein as the "tight side release", was measured on a laminate of release liner/polymeric material/porous layer. The same procedure as described for "180° Angle Peel Adhesion Test 1 (Easy Side Release=Adhesive Strength)" was used with the following modification. The polymeric material/porous layer was carefully lifted away from the release liner adhered to the platen surface, doubled-back at an angle of 180 degrees, and secured to the clamp of the peel adhesion tester. The 180 degree peel adhesion strength between the release liner and polymeric material was measured after all aging conditions (A, B, and C) given below.

A) After 7 days at 23° C. (73° F.) and 50% relative humidity (RH);
B) After 7 days at 70° C. (158° F.) followed by equilibration for 4 hours at 23° C./50% RH;
C) After 7 days at 32° C. (90° F.) followed by equilibration for 4 hours at 23° C./50% RH.

Preparative Example 1

An air and water barrier article having a porous layer partially impregnated and covered on one side with a polymeric material and having a discontinuous pressure sensitive adhesive layer disposed on the side of the porous layer opposite the side that was coated with the polymeric material was prepared as follows. The polymeric material composition was provided by charging the following materials into a mixing vessel that was then place in a dual asymmetric centrifuge mixer: 39.8 parts by weight (hereinafter abbreviated as "pbw") of a silyl-terminated polyether, KANEKA MS POLYMER S203H, 1.25 pbw of hydrophobic fumed silica, AEROSIL R202, 26.7 pbw of calcium carbonate OMYACARB 5-FL, and 4.4 pbw of titanium oxide, TIONA 696. After mixing at 2500 rpm for four minutes 0.87 pbw of an aminosilane, DYNASYLAN DAMO-T, 0.87 pbw of a vinyl trimethoxysilane, DYNASYLAN VTMO, and 0.19 pbw of a tin catalyst, NEOSTANN U-220H, were added and mixed at 2500 rpm for two minutes. This final mixture was used to coat RELEASE LINER 1 using a notch bar coater having a gap setting that was 0.30 millimeters (0.012 inches) greater than the thickness of RELEASE LINER 1. The coated RELEASE LINER 1 was then laminated to a porous layer, REEMAY 2024 polyester, at room temperature (23° C. (73° F.)) using a hand roller and negligible pressure. This laminate construction was cured at 93° C. (200° F.) for 8 hours. The release paper then was removed to give a partially impregnated air and water barrier article having a continuous layer of polymeric material on one side of a porous layer, and having an approximate total thickness of 0.33 millimeters (0.0128 inches).

A pressure sensitive adhesive composition was prepared by mixing 99 parts pbw isooctyl acrylate (IOA), 1 pbw acrylic acid (AA) and 0.04 pbw of a photoinitiator, IRGACURE 651. This mixture was partially polymerized under a nitrogen atmosphere by exposure to low intensity ultraviolet radiation to provide a coatable syrup having a viscosity of about 4000 cps. An additional 0.26 pbw of IRGACURE 651, 0.13 pbw of 2,6-bis-trichoromethyl-6-(3,4-dimethoxyphenyl)-s-triazine, and 6 pbw of a tackifier, FORAL 85 LB, were added to the syrup and mixed until all of the components had completely dissolved to give a pressure sensitive adhesive precursor composition.

The pressure sensitive adhesive precursor composition was provided to dispensing outlets on both a first distribution manifold and a second distribution manifold. The dispensing outlets on the first manifold, spaced 12.5 millimeters (0.5 inches) apart, were reciprocated at a rate of 1.67 Hz and a peak-to-peak amplitude of 12.5 millimeters (0.5 inches) in the width-wise direction of the liner as it moved in its' length-wise direction, while the dispensing outlets on the second manifold, spaced 12.5 millimeters (0.5 inches) apart, were kept stationary.

The precursor composition was coated at a line speed of 2.74 meters/minute (9 feet/minute) onto RELEASE LINER 1.

The coating weight was 0.013 grams/square centimeter (32 grains per a 4 inch by 6 inch area). The coated liner was then exposed to ultraviolet radiation having a spectral output from 300-400 nm with a maximum at 351 nm in a nitrogen-rich environment. An intensity of about 9.0 milliWatts/square centimeter was used during the exposure time, resulting in a total energy (dose) of 1800 milliJoules/square centimeter.

The result was a pattern of parallel sinusoids of the pressure sensitive adhesive composition aligned in the longitudinal direction of the paper liner and positioned between the straight line stripes of the pressure sensitive adhesive composition. The sinusoidal patterns contacted the straight line patterns. The adhesive covered approximately 56% of the area of the liner surface, with approximately two thirds of that being attributable to the sinusoidal patterned adhesive and approximately one third of that being attributable to the straight line patterned adhesive.

For nail sealability evaluation the release liner containing the pattern-coated pressure sensitive adhesive was transfer laminated using hand pressure to a 12.7 millimeter (0.5 inch) thick piece of plywood substrate. Next, the air and water barrier article was laminated by hand to the plywood substrate such that the porous layer covered the patterned coated pressure sensitive adhesive layer. This article was then evaluated for nail sealability using Modified Test Method 1.

Measurement of water vapor transmission was conducted on a sample prepared by directly laminating the exposed pressure sensitive adhesive surface of the pattern-coated pressure sensitive adhesive paper liner onto the non-coated surface of the air and water barrier precursor material. This was rolled down by hand using a rubber roller to ensure transfer of the adhesive onto the air and water barrier precursor article to give an air and water barrier article having a pattern coated pressure sensitive adhesive on one side and a polymeric material coated on the opposite side. The results are shown in Table 1.

| Example Formulation (wt %) | |
|---|---|
| Example | 1 |
| KANEKA MS POLYMER S203H | 53.7 |
| AEROSIL R202 | 1.7 |
| OMYACARB 5 FL | 36.2 |
| TIONA 696 | 5.8 |
| DYNASYLAN DAMO-T | 1.2 |
| DYNASYLAN VTMO | 1.2 |
| NEOSTANN U220H | 0.3 |
| Total | 100 |

TABLE 1

Results
Nail Sealability (Test 1) and Permeability

| | Nail Sealability | | Moisture Vapor Transmission | Total |
|---|---|---|---|---|
| Ex. | Top Side Test 1 | Bottom Side Test 1 | Permeance (Perms) | Thickness (mm) |
| 1 | A | A | 12.29 | 0.325 |

Control Example 2

An air and water barrier precursor article having a porous layer partially impregnated and covered on one side with a polymeric material and having Release Liner 1 disposed on the side of the polymeric material layer opposite the side in contact with the porous layer was prepared and evaluated for "tight side" release as follows. Release Liner 1 was coated with polymeric material as described in Preparative Example 1. The exposed surface of the polymeric material was then laminated to a porous layer, REEMAY 2024 polyester as described in Preparative Example 1 and cured at 93° C. (200° F.) for 8 hours. The resulting construction was tested for "tight side" release according to the test method "180° Angle Peel Adhesion Test 2 (Liner Release)". The results are shown in Table 2

Control Example 3

An air and water barrier precursor article having a porous layer covered on one side with a discontinuous pressure sensitive adhesive layer and having Release Liner 1 disposed on the side of the discontinuous pressure sensitive adhesive layer opposite the side in contact with the porous layer was prepared and evaluated for "easy side" release as follows. A pressure sensitive adhesive precursor composition was prepared, coated onto polyethylene film having a silicone coating on both sides, and cured using the process described in Preparative Example 1. A pattern of parallel sinusoids of the pressure sensitive adhesive composition aligned in the longitudinal direction of the release liner and positioned between, and contacting, the straight line stripes of the pressure sensitive adhesive composition, covering approximately 56% of the area of the film surface, was thus provided. The pressure sensitive adhesive coated surface of the silicone coated polyethylene film was then laminated to a porous layer, REEMAY 2024 polyester, at room temperature (23° C. (73° F.)) using a hand roller and negligible pressure. The silicone coated polyethylene film was then removed and Release Liner 1 was laminated to the exposed pressure sensitive adhesive surface at room temperature (23° C. (73° F.)) using a hand roller and negligible pressure. The side of Release Liner 1 in contact with the pressure sensitive adhesive was the side opposite that which contacted the polymeric material in Preparative Example 2. The resulting construction was tested for "easy side" release according to the test method "180° Angle Peel Adhesion Test 2 (Adhesive Strength)". The results are shown in Table 2

Control Example 4

Preparative Example 2 was repeated with the following modification. Release Liner 2 was used in place of Release Liner 1, and no DYNASYLAN DAMO-T was used in the preparation of the polymeric material.

Control Example 5

Preparative Example 3 was repeated with the following modification. Release Liner 2 was used in place of Release Liner 1, and the side of Release Liner 2 in contact with the pressure sensitive adhesive was the side opposite that which contacted the polymeric material in Preparative Example 4.

Control Example 6

Preparative Example 2 was repeated with the following modification. Release Liner 3 was used in place of Release Liner 1 and the polymeric material was in contact with the side of the liner that was not treated with silicone.

Control Example 7

Preparative Example 3 was repeated with the following modification. Release Liner 3 was used in place of Release Liner 1 and the pressure sensitive adhesive was in contact with the side of the liner that was treated with silicone.

Control Example 8

Preparative Example 2 was repeated with the following modification. Release Liner 4 was used in place of Release Liner 1.

Illustrative Example 9

Control Example 8 was repeated with the following modification. The release liner was provided with a dot pattern of INK 1 on one side using a handheld flexographic printing unit followed by drying at room temperature. The dots had a diameter of 1.0 millimeters and a center-to-center spacing of 1.2 millimeters. The dot pattern covered approximately 38% of the release liner surface. The polymeric material was then coated over the dot pattern.

Illustrative Example 10

Illustrative Example 9 was repeated with the following modification. The dots had a diameter of 0.5 millimeters and a center-to-center spacing of 0.7 millimeters. The dot pattern covered approximately 70% of the release liner surface.

Illustrative Example 11

Control Example 2 was repeated with the following modifications. Release Liner 5 was used in place of Release Liner 1, and the release liner was provided with a flood coating of INK 1 on one side using a #0 Meyer bar followed by drying at room temperature to provide 100% ink coverage of the liner. The polymeric material was then coated over the ink flood coat.

Illustrative Example 12

Illustrative Example 11 was repeated with the following modifications. Release Liner 6 was used in place of Release Liner 5. INK 1 was in contact with the side of the liner that was not treated with silicone.

Illustrative Example 13

Illustrative Example 12 was repeated with the following modifications. INK 2 was used in place of INK 1.

Illustrative Example 14

Illustrative Example 12 was repeated except Release Liner 7 was used in place of Release Liner 6. The ink was in contact with the matte side of Release Liner 7.

Illustrative Example 15

Illustrative Example 13 was repeated except Release Liner 7 was used in place of Release Liner 6. The ink was in contact with the matte side of Release Liner 7.

Illustrative Example 16

Illustrative Example 12 was repeated except Release Liner 8 was used in place of Release Liner 6. The ink was in contact with the polyolefin primed side.

Illustrative Example 17

Illustrative Example 13 was repeated except Release Liner 8 was used in place of Release Liner 6. The ink was in contact with the polyolefin primed side.

Illustrative Example 18

Illustrative Example 12 was repeated except Release Liner 9 was used in place of Release Liner 6. The ink was in contact with the side opposite the siliconized side.

Illustrative Example 19

Illustrative Example 13 was repeated except Release Liner 9 was used in place of Release Liner 6. The ink was in contact with the side opposite the siliconized side.

Illustrative Example 20

Illustrative Example 13 was repeated except INK 3 was used in place of INK 2.

Illustrative Example 21

Illustrative Example 13 was repeated except INK 4 was used in place of INK 2.

Illustrative Example 22

Illustrative Example 12 was repeated except INK 5 was used in place of INK 1.

Illustrative Example 23

Illustrative Example 13 was repeated except INK 6 was used in place of INK 2.

Illustrative Example 24

Illustrative Example 23 was repeated except RELEASE LINER 9 was used in place of RELEASE LINER 6. The ink was in contact with the side opposite the siliconized side.

Illustrative Example 25

Illustrative Example 13 was repeated except INK 7 was used in place of INK 2.

Illustrative Example 26

Illustrative Example 25 was repeated except RELEASE LINER 9 was used in place of RELEASE LINER 6. The ink was in contact with the side opposite the siliconized side.

Illustrative Example 27

Illustrative Example 13 was repeated except COATING 1 was used in place of INK 2.

Illustrative Example 28

Illustrative Example 18 was repeated except COATING 2 was used in place of INK 1.

Illustrative Example 29

Illustrative Example 17 was repeated except COATING 2 was used in place of INK 1.

Illustrative Example 30

Illustrative Example 17 was repeated except no ink was coated prior to the polymeric composition being coated.

Illustrative Example 31

Illustrative Example 18 was repeated except no ink was coated prior to the polymeric composition being coated.

Example 32

Illustrative Example 17 was repeated except INK 2 was coated 4 inches wide down the length, approximately in the middle of the release liner, as well as approximately 2 inches wide along each longitudinal edge, and dried. This resulted in areas free of INK 2 between the middle and edge areas. INK 1 was then coated over INK 2 and across the entire face of the liner and dried. Both ink coatings were applied by means of a gravure coater. Next, the polymeric material was coated over the entire surface of INK 1, the porous layer laminated to the exposed surface of the polymeric material, and the entire construction was cured. The resulting construction was tested for "tight side" release according to the test method "180° Angle Peel Adhesion Test 2 (Liner Release)" with the following modifications. Test samples were cut in the lengthwise direction at various positions across the width of the construction. In this manner the peel strength between the release liner and the ink in contact with it was determined as the ink in contact with the release liner changed from INK 1 to INK 2. The following ink ratios in contact with the release liner were evaluated.

a. 100% INK 1
b. 87.5% INK 1; 12.5% INK 2
c. 75% INK 1; 25% INK 2
d. 50% INK 1; 50% INK 2
e. 25% INK 1; 75% INK 2
f. 12.5% INK 1; 87.5% INK 2
g. 100% INK 2

TABLE 2

180° Angle Peel Adhesion After 7 Days at 23° C./50% RH

| Ex. | Release Liner | Tight Side Release oz/in (N/dm) | Easy Side Release oz/in (N/dm) |
| --- | --- | --- | --- |
| 2 | 1 | 27.2 (29.8) | NA |
| 3 | 1 | NA | 1.2 (1.32) |
| 4 | 2 | 18.6 (20.3) | NA |
| 5 | 2 | NA | 0.9 (1.0) |
| 6 | 3 | 4.2 (4.6) | NA |
| 7 | 3 | NA | 1.5 (1.7) |
| 8 | 4 | 14.7 (16.1) | NA |
| 9 | 4 | 10.6 (11.6) | NA |
| 10 | 4 | 3.4 (3.7) | NA |
| 11 | 5 | 11.9 (13.0) | NA |
| 12 | 6 | 15.3 (16.7) | NA |
| 13 | 6 | 0.7 (0.8) | NA |
| 14 | 7 | 12.3 (13.5) | NA |
| 15 | 7 | 1.1 (1.2) | NA |
| 16 | 8 | 9.7 (10.6) | NA |
| 17 | 8 | 0 (0) | NA |
| 18 | 9 | 11.5 (12.6) | NA |
| 19 | 9 | 0.2 (0.22) | NA |
| 20 | 6 | 4.4 (4.8) | NA |
| 21 | 6 | 3.6 (3.9) | NA |
| 22 | 6 | 21.9 (24.0) | NA |
| 23 | 6 | 0.61 (0.67) | NA |
| 24 | 9 | 0.79 (0.86) | NA |
| 25 | 6 | 0.18 (0.20) | NA |
| 26 | 9 | 0.74 (0.81) | NA |
| 27 | 6 | 4.9 (5.4) | NA |
| 28 | 9 | 14.1 (15.4)* | NA |
| 29 | 8 | 6.6 (7.2)* | NA |
| 30 | 8 | 29.5 (32.3) | NA |
| 31 | 9 | 20. 6(22.5) | NA |
| 32a | 8 | 9.7 (10.6) | NA |

TABLE 2-continued

180° Angle Peel Adhesion After 7 Days at 23° C./50% RH

| Ex. | Release Liner | Tight Side Release oz/in (N/dm) | Easy Side Release oz/in (N/dm) |
|---|---|---|---|
| 32b | 8 | 5.2 (5.7) | NA |
| 32c | 8 | 4.0 (4.4) | NA |
| 32d | 8 | 2.9 (3.2) | NA |
| 32e | 8 | 1.9 (2.1) | NA |
| 32f | 8 | 0.87 (0.95) | NA |
| 32g | 8 | 0.34 (0.38) | NA |

NA: not applicable
*Only dwelled for 48 hrs

TABLE 3

180° Angle Peel Adhesion After 7 Days at 70° C.

| Ex. | Release Liner | Tight Side Release oz/in (N/dm) |
|---|---|---|
| 2 | 1 | Sample delaminated during testing |
| 3 | 1 | NA |
| 4 | 2 | 16.4 (17.9) |
| 5 | 2 | NA |
| 6 | 3 | 7.5 (8.2) |
| 7 | 3 | NA |
| 8 | 4 | 14.4 (15.7) |
| 9 | 4 | 10.8 (11.8) |
| 10 | 4 | 3.3 (3.6) |
| 11 | 5 | 10.2 (11.2) |
| 12 | 6 | 16.3 (17.8) |
| 13 | 6 | 1.3 (1.4) |
| 14 | 7 | 12.7 (13.9) |
| 15 | 7 | 1.4 (1.5) |
| 16 | 8 | 6.5 (7.1) |
| 17 | 8 | 0 (0) |
| 18 | 9 | 12.4 (13.6) |
| 19 | 9 | 0.4 (0.44) |
| 20 | 6 | 5.8 (6.3) |
| 21 | 6 | 5 (5.5) |
| 22 | 6 | 23.2 (25.4) |
| 23 | 6 | 1.1 (1.2) |
| 24 | 9 | 1.4 (1.5) |
| 25 | 6 | 0.21 (0.23) |
| 26 | 9 | Liner fell off prior to testing |
| 27 | 6 | 15.9 (17.4) |
| 28 | 9 | 15.8 (17.3)* |
| 29 | 8 | 8 (8.8)* |
| 30 | 8 | 22.5 (24.6) |
| 31 | 9 | 23 (25.2) |
| 32a | 8 | 16.4 (17.9) ** |
| 32b | 8 | 11.3 (12.4) ** |
| 32c | 8 | 10.1(11.1) ** |
| 32d | 8 | 5.3 (5.8) ** |
| 32e | 8 | 2.8 (3.1) ** |
| 32f | 8 | 1.8 (1.9) ** |
| 32g | 8 | 0.69 (0.75) ** |

NA: not applicable
*Only dwelled for 48 hrs
** Only dwelled for 72 hours

TABLE 4

180° Angle Peel Adhesion After 7 Days at 32° C./90% RH

| Ex. | Release Liner | Tight Side Release oz/in (N/dm) |
|---|---|---|
| 2 | 1 | 28.3 (31.0) |
| 3 | 1 | NA |
| 4 | 2 | 7.8 (8.5) |
| 5 | 2 | NA |
| 6 | 3 | 6.5 (7.1) |
| 7 | 3 | NA |

TABLE 4-continued

180° Angle Peel Adhesion After 7 Days at 32° C./90% RH

| Ex. | Release Liner | Tight Side Release oz/in (N/dm) |
|---|---|---|
| 8 | 4 | 14.3 (15.7) |
| 9 | 4 | 10.8 (11.8) |
| 10 | 4 | 4.3 (4.7) |
| 11 | 5 | 11.7 (12.8) |
| 12 | 6 | 13.7 (15.0) |
| 13 | 6 | 0.3 (0.3) |

NA: not applicable

As seen in Tables 2, 3, and 4 release strength values remain relatively stable even after aging for 7 days at 70° C., and/or for 7 days at 90% RH and 32° C. (90° F.) for some examples.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

What is claimed is:

1. A roll comprising:
    an air and water barrier article having opposing first and second major surfaces and a length;
    a pressure sensitive adhesive disposed on at least the first major surface of the air and water barrier article;
    a first coating composition and a second coating composition disposed on the opposing second major surface of the air and water barrier article; and
    a liner having a first major surface that is in contact with the first coating composition and the second coating composition, wherein the first coating composition has a first peel adhesion to the first major surface of the liner that is lower than a second peel adhesion of the second coating composition to the first major surface of the liner,
    wherein the pressure sensitive adhesive contacts a second major surface of the liner when wound in the roll, and
    wherein a peel adhesion between the second major surface of the liner and the pressure sensitive adhesive is less than or equal to the second peel adhesion.

2. The roll of claim 1, wherein a sum of the first peel adhesion times the fraction of a peel front provided by the first coating composition and the second peel adhesion times the fraction of a peel front provided by the second coating composition is greater than or equal to the peel adhesion between the second major surface of the liner and the pressure sensitive adhesive.

3. The roll of claim 1, wherein the first peel adhesion is less than or equal to 2 Newtons per decimeter.

4. The roll of claim 1, wherein a ratio of the first peel adhesion to the second peel adhesion is in a range from 1:2 to 1:20.

5. The roll of claim 1, wherein the first coating composition forms at least one continuous strip extending along the length of the roll.

6. The roll of claim 1, wherein at least one of the first coating composition or the second coating composition is discontinuous.

7. The roll of claim 1, wherein at least one of the first or second coating compositions comprises at least one of a polyamide, a polyurethane, a vinyl polymer, an acrylic polymer, or a nitrocellulose polymer.

8. The roll of claim 1, wherein the liner comprises at least one of a polyester film, polyethylene film, polypropylene film, a polyolefin coated polymer film, polyolefin coated paper, an acrylic coated polymer film, and polymer coated kraft paper.

9. The roll of claim 1, wherein at least one of the first major surface of the liner or the second major surface of the liner comprises a release coating.

10. The roll of claim 1, wherein the air and water barrier article and the pressure sensitive adhesive together form a construction that is water vapor permeable.

11. The roll of claim 1, wherein the air and water barrier article comprises a porous layer at least partially impregnated with a polymeric material, and wherein a first major surface of the porous layer is covered with the polymeric material.

12. The roll of claim 1, wherein a width of the roll is at least 2.5 centimeters.

13. The roll of claim 1, wherein the liner is derived from applying a layer comprising a (meth)acrylate-functional siloxane to a major surface of a substrate; and irradiating said layer, in a substantially inert atmosphere comprising no greater than 500 ppm oxygen, with a short wavelength polychromatic ultraviolet light source having at least one peak intensity at a wavelength of from about 160 nanometers to about 240 nanometers to at least partially cure the layer, optionally wherein the layer is at a curing temperature greater than 25° C.

14. The roll of claim 1, wherein the air and water barrier article comprises a major surface of a porous layer that is coated with a polymeric material.

15. The roll of claim 14, wherein the polymeric material comprises a polyoxyalkylene polymer having at least one end group derived from an alkoxy silane.

16. The roll of claim 15, wherein all of the end groups of the polyoxyalkylene polymer are silyl terminated.

17. The roll of claim 1, wherein the second coating composition occupies a greater area than the first coating composition.

18. The roll of claim 17, wherein a ratio of an area of the second coating composition to an area of the first coating composition is at least 2:1.

19. A method of applying an air and water barrier article, the method comprising:
adhering at least a portion of the pressure sensitive adhesive on the roll of claim 1 to a surface of a building component, so that the air and water barrier article is affixed to the surface of the building component; and
unwinding at least a portion of the roll, wherein during the unwinding, the liner releases from the pressure sensitive adhesive and remains adhered to at least the second coating composition on the air and water barrier article.

20. The method of claim 19, further comprising peeling the liner away from the first and second coating compositions on the air and water barrier article, wherein peeling is initiated at a location of the first coating composition.

* * * * *